United States Patent
Tung

(10) Patent No.: US 12,206,970 B2
(45) Date of Patent: Jan. 21, 2025

(54) IMAGING LENS AND ELECTRONIC DEVICE

(71) Applicant: LARGAN PRECISION CO., LTD., Taichung (TW)

(72) Inventor: Wei-Che Tung, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 169 days.

(21) Appl. No.: 17/878,843

(22) Filed: Aug. 1, 2022

(65) Prior Publication Data
US 2023/0247273 A1    Aug. 3, 2023

Related U.S. Application Data

(60) Provisional application No. 63/304,468, filed on Jan. 28, 2022.

(51) Int. Cl.
| | |
|---|---|
| *H04N 23/55* | (2023.01) |
| *G02B 13/00* | (2006.01) |
| *G06F 1/16* | (2006.01) |

(52) U.S. Cl.
CPC ......... *H04N 23/55* (2023.01); *G02B 13/0015* (2013.01); *G02B 13/0055* (2013.01); *G02B 2207/101* (2013.01); *G06F 1/1686* (2013.01)

(58) Field of Classification Search
CPC .................................. G02B 1/11; G02B 1/118
See application file for complete search history.

(56) References Cited

U.S. PATENT DOCUMENTS

| | | |
|---|---|---|
| 11,327,299 B2 | 5/2022 | Lai et al. |
| 2014/0320969 A1 | 10/2014 | Lee et al. |
| 2015/0103226 A1 | 4/2015 | Takahashi et al. |
| 2016/0320530 A1 | 11/2016 | Umetani et al. |

(Continued)

FOREIGN PATENT DOCUMENTS

| | | |
|---|---|---|
| CN | 203981945 A | 12/2014 |
| CN | 204536581 A | 8/2015 |

(Continued)

OTHER PUBLICATIONS

IN Patent Examination Report dated Feb. 12, 2024 as received in Application No. 202334004277.

*Primary Examiner* — Noam Reisner
(74) *Attorney, Agent, or Firm* — Maschoff Brennan

(57) ABSTRACT

An imaging lens includes a light blocking sheet that includes an inner ring surface, a plurality of tapered light blocking structures, and a nanostructure layer. The inner ring surface surrounds an optical axis and defines a light passage opening. The tapered light blocking structures are disposed on the inner ring surface, and each tapered light blocking structure protrudes from the inner ring surface and tapers off towards the optical axis. The tapered light blocking structures are periodically arranged to surround the optical axis. The contour of each tapered light blocking structure has a curved part in a view along the optical axis. The curved part forms a curved surface on the inner ring surface. The nanostructure layer is disposed on the curved surface and has a plurality of ridge-like protrusions that extend non-directionally, and the average structure height of the nanostructure layer ranges from 98 nanometers to 350 nanometers.

61 Claims, 32 Drawing Sheets

(56) References Cited

U.S. PATENT DOCUMENTS

| | | | |
|---|---|---|---|
| 2018/0246260 A1 | 8/2018 | Chou et al. | |
| 2021/0223499 A1 | 7/2021 | Feng et al. | |
| 2021/0389511 A1 | 12/2021 | Zhang et al. | |
| 2023/0204828 A1* | 6/2023 | Chang | G02B 13/004 |
| | | | 359/601 |

FOREIGN PATENT DOCUMENTS

| | | |
|---|---|---|
| CN | 106950623 A | 7/2017 |
| CN | 207074332 U | 3/2018 |
| CN | 209028384 U | 6/2019 |
| CN | 110376664 A | 10/2019 |
| CN | 210720787 U | 6/2020 |
| CN | 211266962 U | 8/2020 |
| CN | 212301949 U | 1/2021 |
| CN | 212933025 U | 4/2021 |
| CN | 113031124 A | 6/2021 |
| CN | 113219762 A | 8/2021 |
| TW | 1676852 B | 11/2019 |
| TW | 202129386 A | 8/2021 |

* cited by examiner

IMAGING LENS AND ELECTRONIC DEVICE

RELATED APPLICATIONS

This application claims priority to U.S. Provisional Application 63/304,468, filed on Jan. 28, 2022, which is incorporated by reference herein in its entirety.

BACKGROUND

Technical Field

The present disclosure relates to an imaging lens and an electronic device, more particularly to an imaging lens applicable to an electronic device.

Description of Related Art

With the development of technology, featuring high image quality becomes one of the indispensable features of an optical system nowadays. Furthermore, electronic devices equipped with optical systems are trending towards multi-functionality for various applications, and therefore the functionality requirements for the optical systems have been increasing.

However, conventional optical systems are difficult to meet the requirement of high optical quality of an electronic device under diversified development in recent years, especially image quality which would be easily affected due to non-imaging light (e.g., stray light) reflected in a lens. Therefore, how to improve structures of components inside the imaging lens to reduce reflection intensity of non-imaging light for meeting the requirement of high-end-specification electronic devices is an important topic in this field nowadays.

SUMMARY

According to one aspect of the present disclosure, an imaging lens through which an optical axis passes includes a light blocking sheet. The light blocking sheet includes an object-side surface, an image-side surface, an inner ring surface, a plurality of tapered light blocking structures, and a nanostructure layer. The object-side surface is perpendicular to and surrounding the optical axis. The image-side surface is opposite to the object-side surface, and the image-side surface is located closer to an image side of the imaging lens than the object-side surface. The inner ring surface is connected to and located between the object-side surface and the image-side surface, and the inner ring surface surrounds the optical axis and defines a light passage opening. The plurality of tapered light blocking structures are disposed on the inner ring surface. Each of the plurality of tapered light blocking structures protrudes from the inner ring surface and tapers off towards the optical axis. The plurality of tapered light blocking structures are periodically arranged to surround the optical axis. A contour of each of the plurality of tapered light blocking structures has a first curved part and a second curved part in a view along the optical axis, the first curved part is located closer to the optical axis than the second curved part, and each of the first curved part and the second curved part forms a curved surface on the inner ring surface. The nanostructure layer is at least disposed on the curved surfaces formed by the first curved part and the second curved part. The nanostructure layer has a plurality of ridge-like protrusions that extend non-directionally from the curved surfaces, and an average structure height of the nanostructure layer ranges from 98 nanometers to 350 nanometers.

According to another aspect of the present disclosure, an imaging lens through which an optical axis passes includes a light blocking sheet. The light blocking sheet includes an object-side surface, an image-side surface, an inner ring surface, a plurality of tapered light blocking structures, and a nanostructure layer. The object-side surface is perpendicular to and surrounding the optical axis. The image-side surface is opposite to the object-side surface, and the image-side surface is located closer to an image side of the imaging lens than the object-side surface. The inner ring surface is connected to and located between the object-side surface and the image-side surface, and the inner ring surface surrounds the optical axis and defines a light passage opening. The plurality of tapered light blocking structures are disposed on the inner ring surface. Each of the plurality of tapered light blocking structures protrudes from the inner ring surface and tapers off towards the optical axis. The plurality of tapered light blocking structures are periodically arranged to surround the optical axis. A contour of each of the plurality of tapered light blocking structures has at least one curved part in a view along the optical axis, and the at least one curved part forms a curved surface on the inner ring surface. The nanostructure layer is at least disposed on the curved surfaces formed by the at least one curved part. The nanostructure layer has a plurality of ridge-like protrusions that extend non-directionally from the curved surfaces, and an average structure height of the nanostructure layer ranges from 98 nanometers to 350 nanometers. When a curvature radius of the at least one curved part which has a center of curvature located farther away from the optical axis than the at least one curved part is $R_{VC}$, and a radius of the light passage opening is $R_L$, the following condition is satisfied: $0.05 \leq (R_{VC}/R_L) \times 1.02\pi^4 \leq 34$. When a curvature radius of the at least one curved part which has a center of curvature located closer to the optical axis than the at least one curved part is $R_C$, and the radius of the light passage opening is $R_L$, the following condition is satisfied: $0.11 \leq (R_C/R_L) \times 1.02\pi^4 \leq 49$.

According to another aspect of the present disclosure, an imaging lens through which an optical axis passes includes a light blocking element. The light blocking element includes an object-side surface, an image-side surface, an inner ring surface, and a nanostructure layer. The object-side surface is perpendicular to and surrounding the optical axis. The image-side surface is opposite to the object-side surface, and the image-side surface is located closer to an image side of the imaging lens than the object-side surface. The inner ring surface is connected to and located between the object-side surface and the image-side surface, and the inner ring surface surrounds the optical axis and defines a light passage opening. The nanostructure layer is at least disposed on the inner ring surface, and the nanostructure layer has a plurality of ridge-like protrusions that extend non-directionally from the inner ring surface.

According to another aspect of the present disclosure, an electronic device includes one of the aforementioned imaging lenses.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
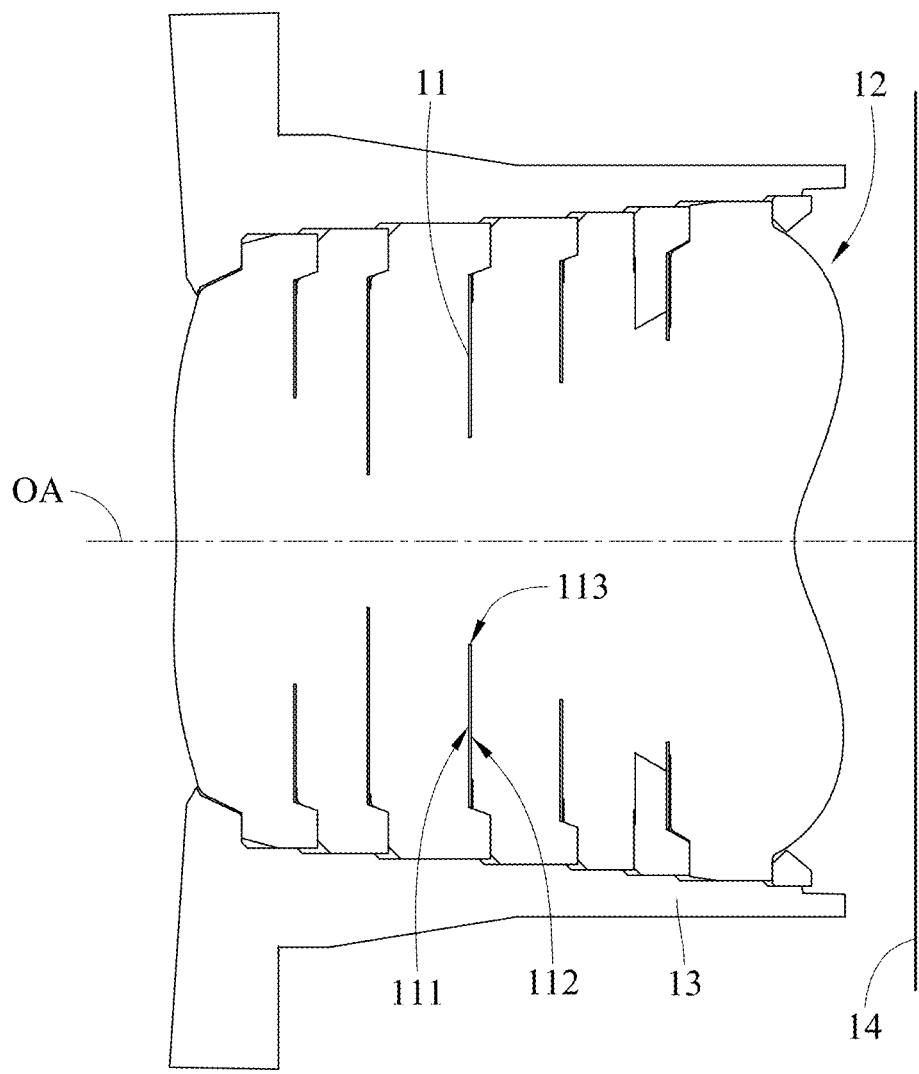
FIG. 1 is a cross-sectional view of an imaging lens according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens through which an optical axis passes. The imaging lens can include a light blocking element and a lens group. The light blocking element can be a light blocking sheet, a spacer, a retainer, a lens barrel, or even a lens barrel integrated with a voice coil motor (VCM). When the light blocking element is a light blocking sheet, a spacer, or a retainer, the imaging lens can further include a lens barrel, and the light blocking element and the lens group can be accommodated in the lens barrel. When the light blocking element is a lens barrel, the lens group can be accommodated in the light blocking element (the lens barrel).

When the light blocking element is a light blocking sheet, the light blocking sheet can be made of composite material or metallic material. For example, the light blocking sheet can be a structure where a substrate layer made of a plastic material, such as polyimide (PI) and polyethylene terephthalate (PET), is clamped by two cover layers. Please refer to FIG. 5, which shows the light blocking sheet 11 of a multi-layer structure where the substrate layer L1 is clamped by two cover layers L2 according to the 1st embodiment of the present disclosure. Alternatively, the light blocking sheet can also be a structure where a substrate layer made of metallic material, such as free machining brass and copper alloy, with black pigment disposed thereon. Please refer to FIG. 18, which shows the light blocking sheet 31 of a single-layer structure where the substrate layer L1 is coated by black pigment according to the 3rd embodiment of the present disclosure. However, the light blocking sheet of the present disclosure is not limited to the abovementioned structures.

When the light blocking element is a light blocking sheet, a spacer, a retainer, or a lens barrel, the light blocking element can include an object-side surface, an image-side surface, an inner ring surface, a plurality of tapered light blocking structures, a microstructure, and a nanostructure layer. The object-side surface is perpendicular to and surrounds the optical axis. The image-side surface is opposite to the object-side surface, and the image-side surface is located closer to an image side of the imaging lens than the object-side surface. The inner ring surface is connected to and located between the object-side surface and the image-side surface. The inner ring surface surrounds the optical axis and defines a light passage opening. Specifically, the light passage opening can be a through hole formed by the minimum opening of the light blocking element. Also, when the inner ring surface is in non-parallel with the optical axis and forms a tapered surface, the light passage opening can be defined by the tip-end formed by the inner ring surface. When the light blocking element is a light blocking sheet, please refer to FIG. 5, which shows the inner ring surface 113 that forms a cylindrical surface in parallel with the optical axis according to the 1st embodiment of the present disclosure. When the light blocking element is a light blocking sheet, please refer to FIG. 15, which shows the inner ring surface 213 that forms a single-side-tapered surface in non-parallel with the optical axis according to the 2nd embodiment of the present disclosure. When the light blocking element is a light blocking sheet, please refer to FIG. 18, which shows the inner ring surface 313 that forms a double-side-tapered surface in non-parallel with the optical axis according to the 3rd embodiment of the present disclosure. Note that the inner ring surface can be a combination of any shape, and the inner ring surface is not limited to the abovementioned shapes.

The tapered light blocking structures are disposed on the inner ring surface. Each of the tapered light blocking structures protrudes from the inner ring surface and tapers off towards the optical axis, and the tapered light blocking structures are periodically arranged to surround the optical axis. By the configuration of the tapered light blocking structures, it is favorable for changing or breaking the smoothness of the inner ring surface so as to reduce reflection intensity of stray light. Moreover, the tapered light blocking structures can be integrally formed with the remaining part of the light blocking element. Therefore, it is favorable for reducing manufacturing time. Please refer to FIG. 2, which shows the tapered light blocking structures 114 that taper off towards the optical axis OA from the inner ring surface 113 and are periodically arranged to surround the optical axis OA according to the 1st embodiment of the present disclosure.

The contour of each of the plurality of tapered light blocking structures has at least one curved part in a view along the optical axis. In specific, the contour of each of the plurality of tapered light blocking structures has a first curved part and a second curved part in the view along the optical axis. The center of curvature of the first curved part can be located farther away from the optical axis than the first curved part. The center of curvature of the second curved part can be located closer to the optical axis than the second curved part. The first curved part and the second curved part can be directly connected to each other or indirectly connected to each other with an additional straight line therebetween, and the present disclosure is not limited thereto. The first curved part can be located closer to the optical axis than the second curved part, and each of the first curved part and the second curved part can form a curved surface on the inner ring surface. Please refer to FIG. 6, which shows the curved surfaces CS formed by the first curved part CP1 and the second curved part CP2 according to the 1st embodiment of the present disclosure. By the configuration of the at least one curved part, it is favorable for suppressing reflection of stray light on the inner ring surface. In addition, the at least one curved part is easy to be manufactured, such that the yield rate can be increased and the light blocking element can be mass produced. Moreover, the second curved part can be located at a side of the first curved part and connected to another first curved part of another tapered light blocking structure adjacent thereto.

The microstructure can be disposed on at least one of the object-side surface and the image-side surface of the light blocking element. The microstructure can have a plurality of protrusions. Please refer to FIG. 5, a structure height H1 of the microstructure is a vertical height from a bottom of the protrusions to a top of the protrusions. The average structure height of at least three or more protrusions among the microstructure can range from 0.25 micrometers to 19 micrometers. Therefore, it is favorable for scattering stray light so as to reduce reflection intensity of stray light. Moreover, each protrusion of the microstructure can be arc-shaped in the cross-sectional view of the light blocking element. In detail, the microstructure can be a plurality of spherical particles embedded in the light blocking element, such that the exposed parts of the spherical particles form the arc-shaped protrusions on the light blocking element. Please refer to FIG. 3, FIG. 5, FIG. 7, and FIG. 8, which show the microstructure 115 that is disposed on the object-side surface 111 and the image-side surface 112 and has a plurality of protrusions PR according to the 1st embodiment of the present disclosure.

The nanostructure layer can be at least disposed on the curved surfaces formed by the first curved part and the second curved part on the inner ring surface. The nanostructure layer has a plurality of ridge-like protrusions that extend non-directionally from the curved surfaces. Please refer to FIG. 5, a structure height of the nanostructure layer can be a vertical height H2 from an absolute bottom (foot of the mountain) of the ridge-like protrusions to a top (mountaintop) of the ridge-like protrusions in the cross-sectional view of the nanostructure layer (destructive measurement); alternatively, please refer to FIG. 4, a structure height of the nanostructure layer can also be a vertical height H3 from a relatively bottom (valley between two mountains) of the ridge-like protrusions to the top (mountaintop) of the ridge-like protrusions in the side view of the nanostructure layer (non-destructive measurement). However, the present disclosure is not limited thereto. The average structure height (i.e., an average value of H2 or H3) of at least three or more ridge-like protrusions among the nanostructure layer can range from 98 nanometers to 350 nanometers. The ridge-like protrusions are wide at the bottom side and narrow at the top side thereof in the cross-sectional view of the light blocking element, which can allow the equivalent refractive index of the nanostructure layer to gradually decrease from the bottom side to the top side and can form a rough surface so as to reduce reflection of stray light. Also, the nanostructure layer can be disposed on the tapered light blocking structures on the inner ring surface, such that the reflectivity of the inner ring surface can be further reduced so as to prevent stray light from affecting image quality to a certain extent. Moreover, the nanostructure layer can be only disposed on the curved surfaces on the inner ring surface so as to reduce manufacturing time, which is favorable for mass production. Moreover, the nanostructure layer can be further disposed on at least one of the object-side surface and the image-side surface. By doing so, it is favorable for reducing the reflectivity of the at least one of the object-side surface and the image-side surface, thereby increasing image quality. Moreover, the nanostructure layer can be further disposed on one of the object-side surface and the image-side surface. By doing so, it is favorable for obtaining a proper balance between image quality and production speed. Also, the nanostructure layer can cover the microstructure, such that intensity of scattered light can be further reduced. Therefore, it is favorable for further improving anti-reflection property of the light blocking element by combining two anti-reflection structures with different scales. Moreover, the nanostructure layer can be evenly distributed on the microstructure. When the structure height of the nanostructure layer is smaller than that of the microstructure, the shape of the microstructure can be maintained, and the microstructure can still have light scattering effect. Please refer to FIG. 4, FIG. 5, and FIG. 9 to FIG. 12, which show the nanostructure layer 116 that is disposed on the object-side surface 111, the image-side surface 112, and the inner ring surface 113, has the ridge-like protrusions RLP, and covers the microstructure 115 on the object-side surface 111 and the image-side surface 112 according to the 1st embodiment of the present disclosure.

Figure 16:
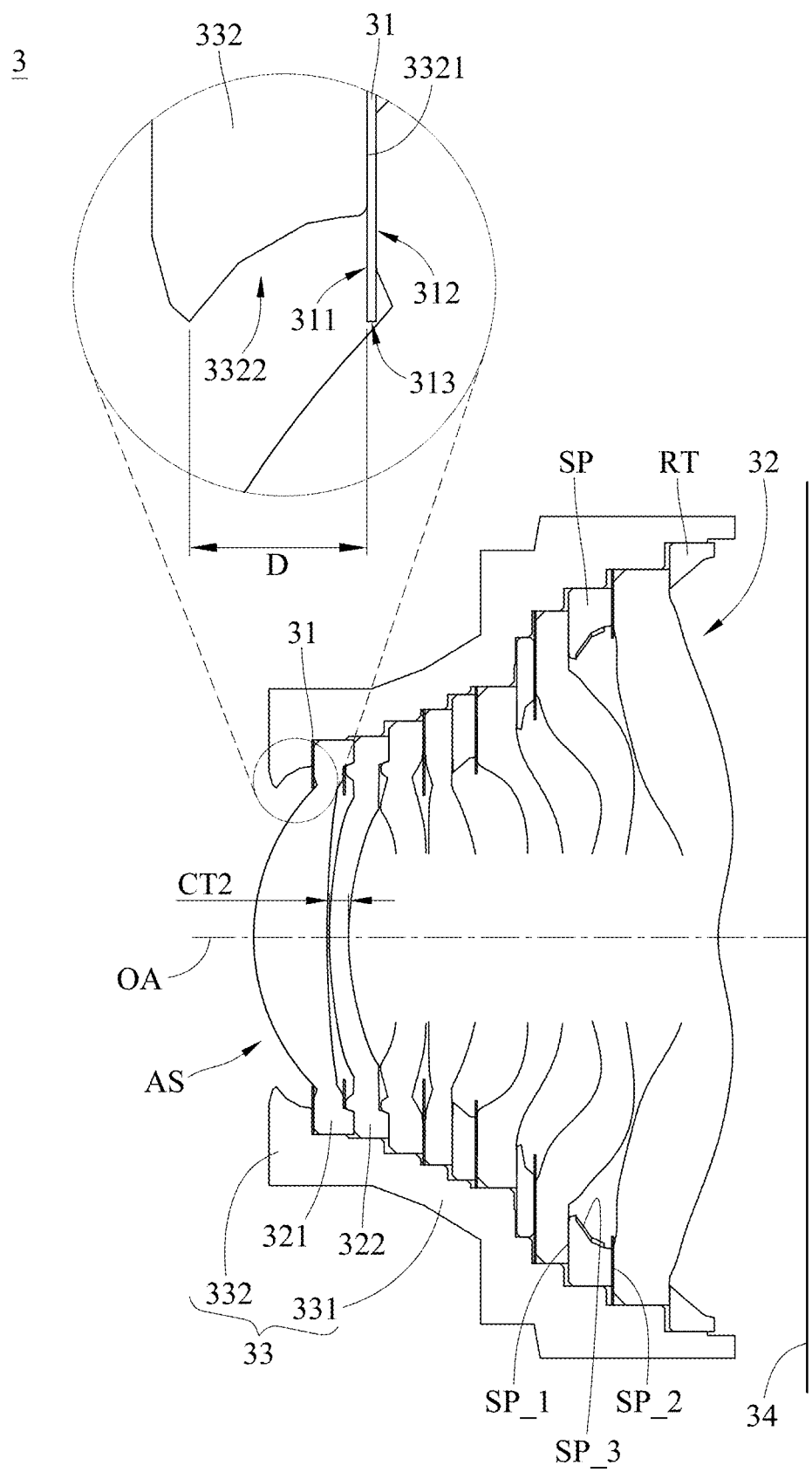
FIG. 16 is a cross-sectional view of an imaging lens according to the 3rd embodiment of the present disclosure.
Figure 22:
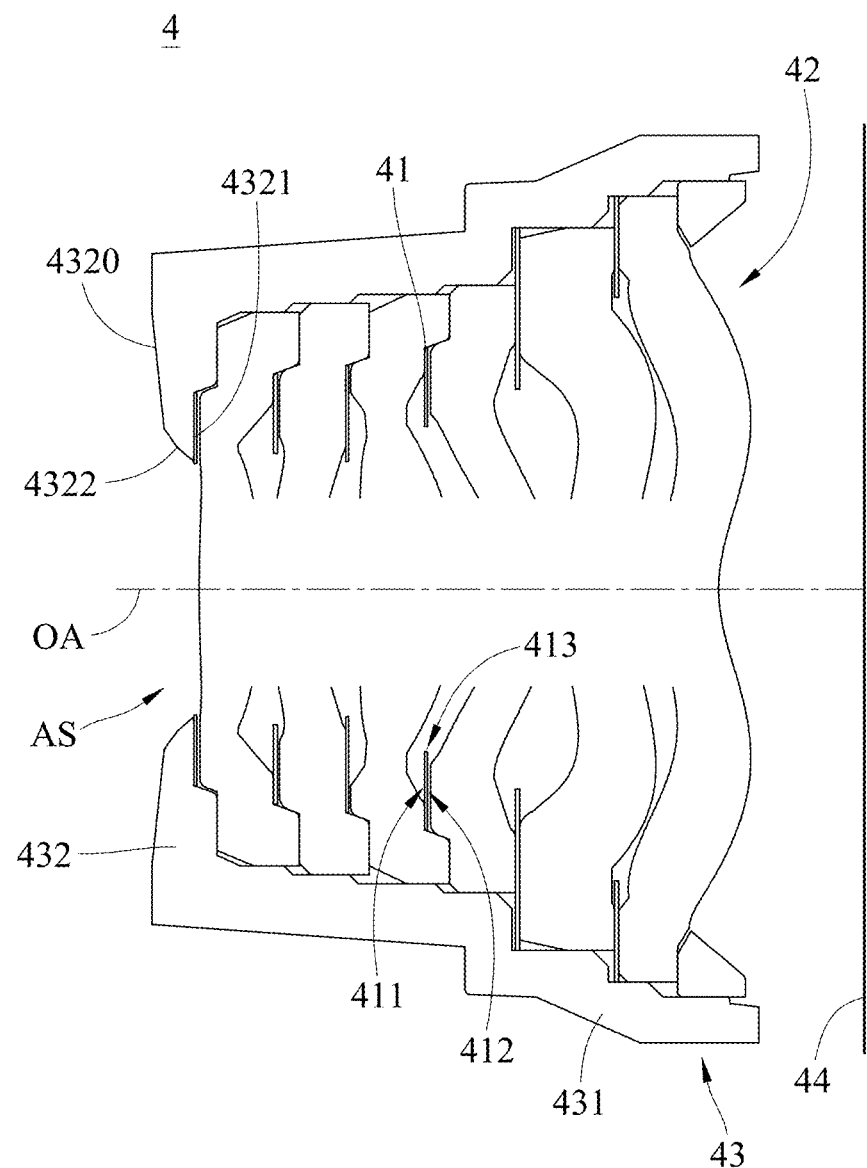
FIG. 22 is a cross-sectional view of an imaging lens according to the 4th embodiment of the present disclosure.
Figure 34:
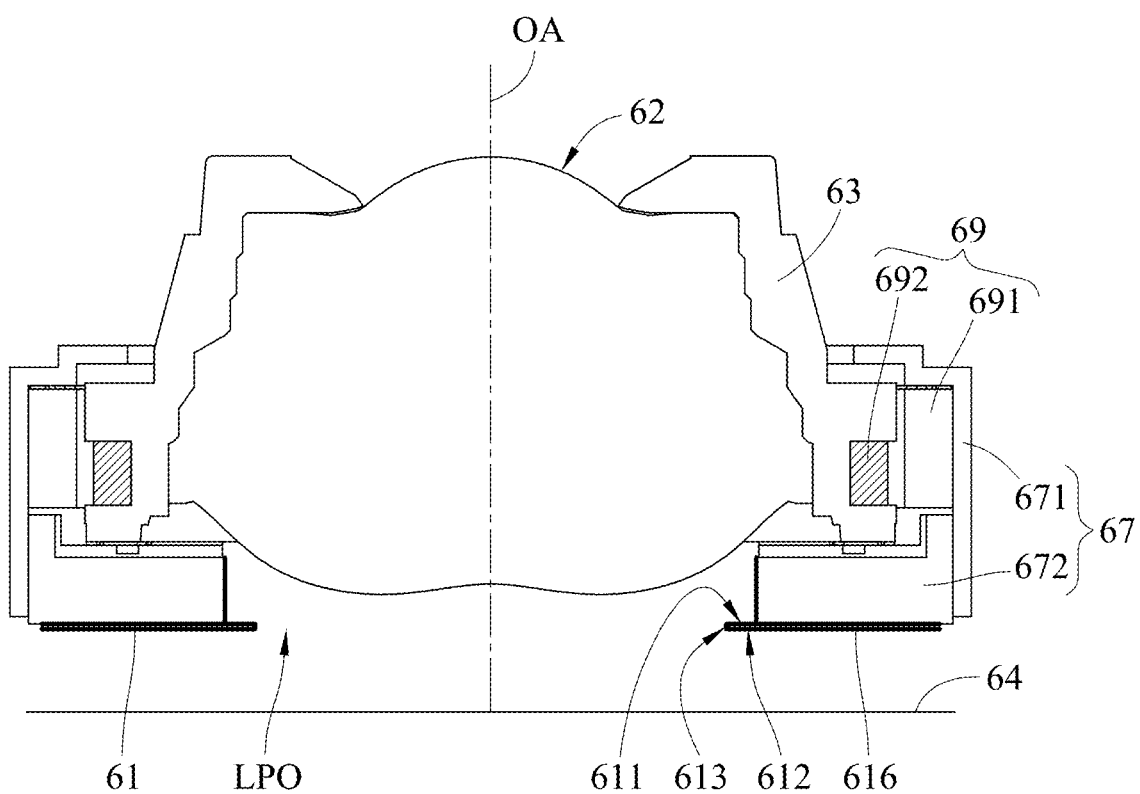
FIG. 34 is a cross-sectional view of an imaging lens according to the 6th embodiment of the present disclosure.

In comparison with the conventional light blocking element with an inner ring surface where stray light is easily reflected, the light blocking element (e.g., the light blocking sheet 11 in FIG. 1 and FIG. 2) according to the present disclosure can reduce its surface reflectivity through the nanostructure layer on the inner ring surface thereof (e.g., the nanostructure layer 116 disposed on the inner ring surface 113 of the light blocking sheet 11), such that stray light is not easily formed on the light blocking element and therefore doesn't easily affect image quality. Moreover, the present disclosure further discloses the tapered light blocking structures with the curved surfaces (e.g., the curved surfaces CS of the tapered light blocking structures 114) for changing or breaking the smoothness of the inner ring surface of the light blocking element (e.g., the inner ring surface 113 of the light blocking sheet 11), and the curved surfaces of the tapered light blocking structures can be provided with a nanostructure layer thereon (e.g., the nanostructure layer 116 disposed on the curved surfaces CS of the tapered light blocking structures 114) for reducing surface reflectivity, such that the stray light is not easily formed on the light blocking element and therefore doesn't easily affect image quality. For example, the present disclosure discloses a subwavelength structure can be additionally disposed on the light blocking element (including, but not limited to, the nanostructure layer with a material including aluminium oxide ($Al_2O_3$) formed on the light blocking element by atomic layer deposition), and then the light blocking element with the subwavelength structure can be designed as an interior part of a light blocking mechanism of a lens. The light blocking element can be the light blocking sheet 11 as shown in FIG. 1, the spacer SP as shown in FIG. 16, a retainer, the lens barrel 43 as shown in FIG. 22, or even the lens barrel 63 integrated with a voice coil motor as shown in FIG. 34. These light blocking elements of different types can be mutually or individually arranged at one or more particular optical positions for providing light blocking effect, thereby effectively controlling non-imaging light inside a lens. The present disclosure is also applicable to electronic devices such as cellphones (with double lenses or multiple lenses), tablets, portable video recorders, and wearable devices, but the present disclosure is not limited thereto.

When a thickness of the light blocking element is T, the following condition can be satisfied: 2 [um]≤T≤88 [um]. Therefore, it is favorable for reducing surface reflection by disposing the nanostructure layer of the nanometer-scale while maintaining lightness and thinness of the light blocking element. When the light blocking element is a light blocking sheet, please refer to FIG. 5, which shows T according to the 1st embodiment of the present disclosure. When the light blocking element is a spacer, please refer to FIG. 20, which shows T' according to the 3rd embodiment of the present disclosure.

When the quantity of the plurality of tapered light blocking structures is N, the following condition can be satisfied: 39≤N≤147. Therefore, it is favorable for reducing reflection of stray light and increasing manufacturing quality.

When a curvature radius of the first curved part is $R_{VC}$, a curvature radius of the second curved part is $R_C$, and a radius of the light passage opening is $R_L$, the following conditions can be satisfied: 0.005 [mm]≤$R_{VC}$≤0.37 [mm]; 0.008 [mm]≤$R_C$≤0.42 [mm]; 0.3≤$R_C/R_{VC}$≤35; 0.05≤($R_{VC}/R_L$)×$1.02\pi^4$≤34; and 0.11≤($R_C/R_L$)×$1.02\pi^4$≤49. Therefore, it is favorable for weakening reflection property of the inner ring surface, such that stray light is further not easily reflected on the inner ring surface. When the light blocking element is a light blocking sheet, please refer to FIG. 2, which shows $R_{VC}$ and $R_C$ according to the 1st embodiment of the present disclosure. When the light blocking element is a light blocking sheet, please refer to FIG. 5, which shows $R_L$ according to the 1st embodiment of the present disclosure.

Figure 38:
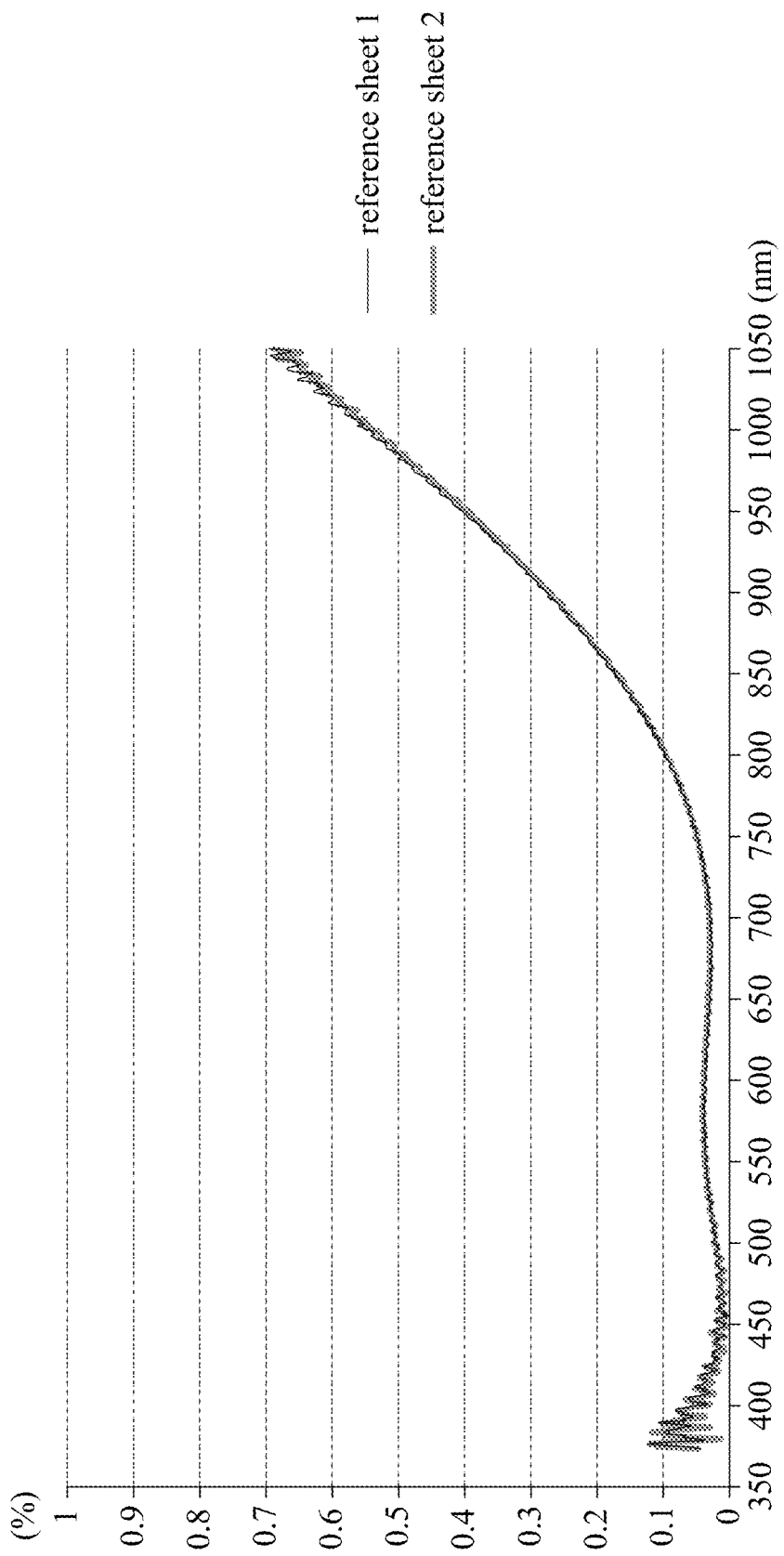
FIG. 38 is a diagram showing experimental data of reflectivity of two surfaces of two reference sheets where nanostructure layers are disposed for light with various wavelengths.

When an average reflectivity of the at least one of the object-side surface and the image-side surface where the nanostructure layer is disposed for light with a wavelength ranging from 750 nanometers to 900 nanometers is $R_{7590}$, the following condition can be satisfied: $R_{7590}$≤0.65%. Therefore, it is favorable for maintaining low reflectivity of the nanostructure layer for light ranging a relatively wide spectrum with respect to the conventional multi-layer membrane so as to keep low reflectivity for light with a long wavelength, thereby meeting special requirements of some imaging lenses, such as ToF sensing lens. However, the present disclosure is not limited thereto. Moreover, the following condition can also be satisfied: $R_{7590}$≤0.5%. Moreover, when an average reflectivity of the at least one of the object-side surface and the image-side surface where the nanostructure layer is disposed for light with a wavelength ranging from 380 nanometers to 400 nanometers is $R_{3840}$, the following condition can be satisfied: $R_{3840}$≤0.75%. Therefore, it is favorable for maintaining low reflectivity for this wavelength band, thereby increasing image quality. Moreover, when an average reflectivity of the at least one of the object-side surface and the image-side surface where the nanostructure layer is disposed for light with a wavelength ranging from 400 nanometers to 700 nanometers is $R_{4070}$, the following condition can be satisfied: $R_{4070}$≤0.5%. Therefore, it is favorable for maintaining low reflectivity for this wavelength band, thereby increasing image quality. Please refer to FIG. 38, which is a diagram showing experimental data of reflectivity of two surfaces of two reference sheets where nanostructure layers are disposed for light with various wavelengths, wherein each reference sheet is a plastic substrate with a nanostructure layer disposed thereon. As shown in FIG. 38, one of the reference sheets (reference sheet 1) satisfies the following conditions: $R_{7590}$=0.14%; $R_{3840}$=0.08%; and $R_{4070}$=0.03%, while the other one of the reference sheets (reference sheet 2) satisfies the following conditions: $R_{7590}$=0.14%; $R_{3840}$=0.07%; and $R_{4070}$=0.03%. The experimental data of reflectivity of the reference sheets provided in FIG. 38 can be considered as the reference to reflectivity of surfaces of various optical elements where nanostructure layers are disposed.

The lens group can include a plurality of lens elements, and the abovementioned nanostructure layer can also be disposed on at least one of the plurality of lens elements. Stray light may be formed between the lens element and the light blocking element. Therefore, in order to reduce reflection intensity of stray light, both of the lens element and the light blocking element can be provided with nanostructure layers disposed thereon, thereby reducing affecting image quality. Moreover, the lens elements can include a first lens element and a second lens element, and the light blocking element, the first lens element, and the second lens element are sequentially arranged along the optical axis from an object side to the image side of the imaging lens. It can be also considered that the lens element located at an image side of the light blocking element is defined as the first lens element and the lens element located at an image side of the first lens element is defined as the second lens element. Please refer to FIG. 16, which shows the light blocking sheet 31, the first lens element 321, and the second lens element 322 that are sequentially arranged along the optical axis OA according to the 3rd embodiment of the present disclosure.

The lens barrel can include a cylindrical portion and a plate portion. The cylindrical portion can surround about the optical axis. The plate portion can be connected to the cylindrical portion, and the plate portion can extend towards the optical axis and form an aperture stop. The plate portion can have an abut surface and an inner wall surface. When the light blocking element is a light blocking sheet, a spacer, or a retainer, the abut surface can be in physical contact with the light blocking element. The inner wall surface can extend towards the abut surface from the aperture stop. The inner wall surface can be spaced apart from the light blocking element by a distance along a direction in parallel with the optical axis. Therefore, it is favorable for forming a light trap structure to reflect stray light within the distance, thereby increasing image quality. Moreover, the distance can gradually decrease along a direction away from the optical axis. Please refer to FIG. 16, which shows the cylindrical portion 331 that surrounds about the optical axis OA, the plate portion 332 that extends towards the optical axis OA and forms the aperture stop AS, and the distance D along a direction in parallel with the optical axis OA between the inner wall surface 3322 and the light blocking sheet 31.

When a maximum value of the distance is Dmax, and a central thickness of the second lens element is CT2, the following conditions can be satisfied: $0.26 \leq Dmax/CT2 \leq 3.2$; and $0.08$ [mm]$\leq CT2 \leq 0.82$ [mm]. Please refer to FIG. 16, which shows Dmax and CT2 according to the 3rd embodiment of the present disclosure.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
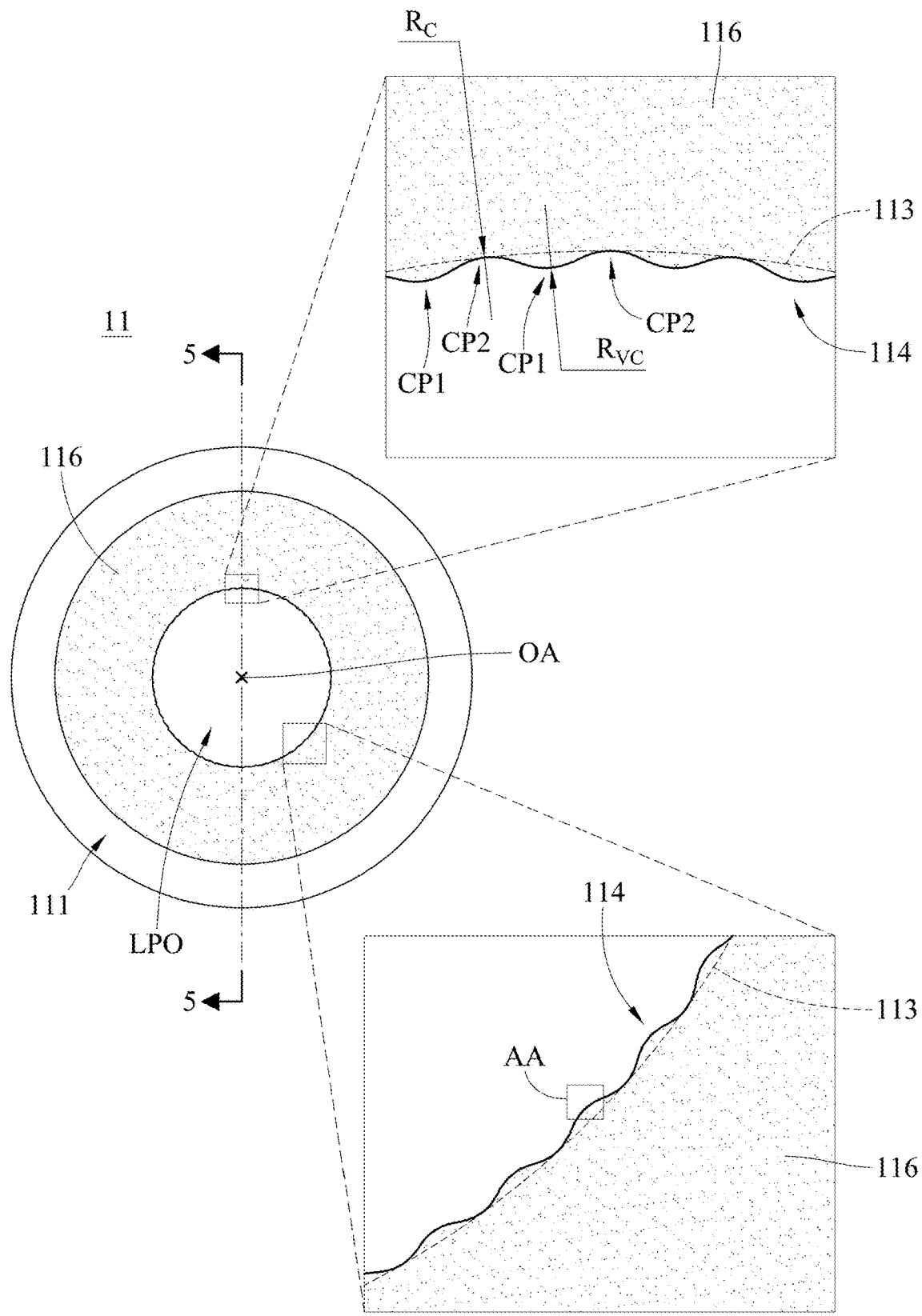
FIG. 2 is a top view of a light blocking sheet of the imaging lens in FIG. 1.
Figure 3:
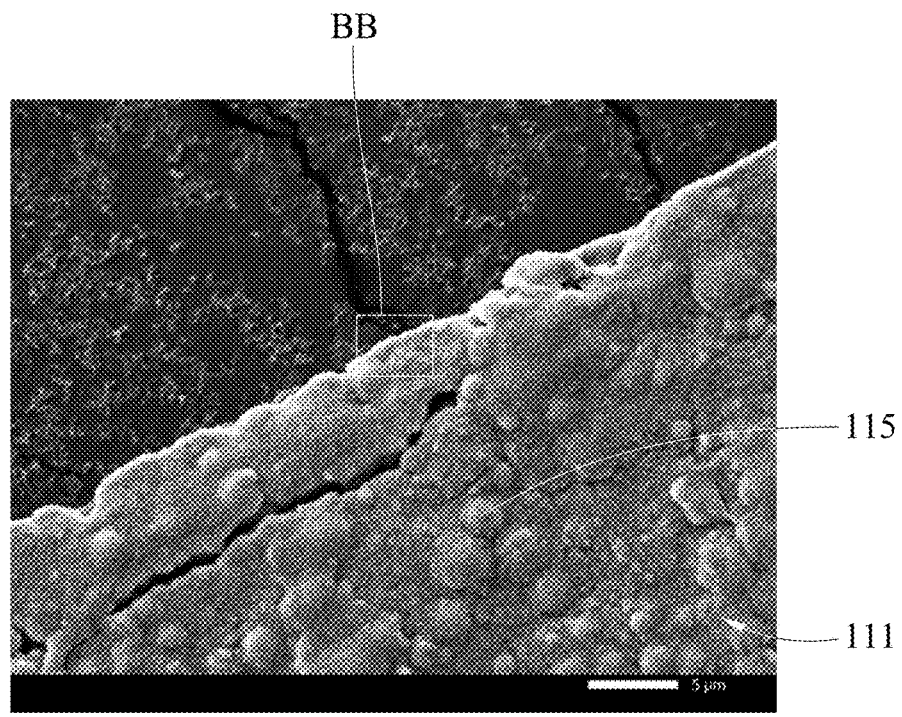
FIG. 3 is a schematic view of AA region of the light blocking sheet in FIG. 2 at a scale of 1:3000.
Figure 4:
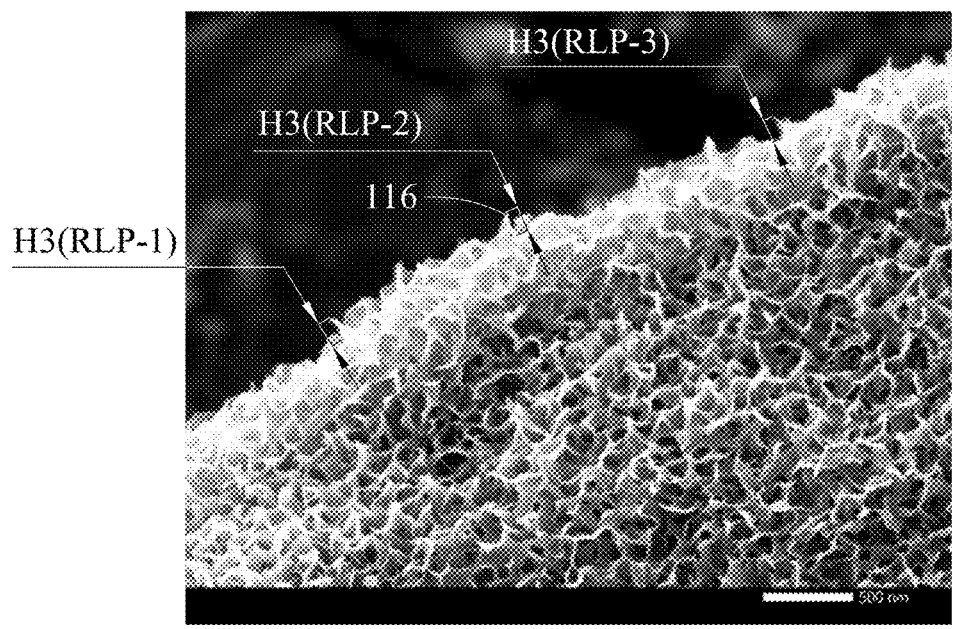
FIG. 4 is a schematic view of BB region of AA region in FIG. 3 at a scale of 1:30000.
Figure 5:
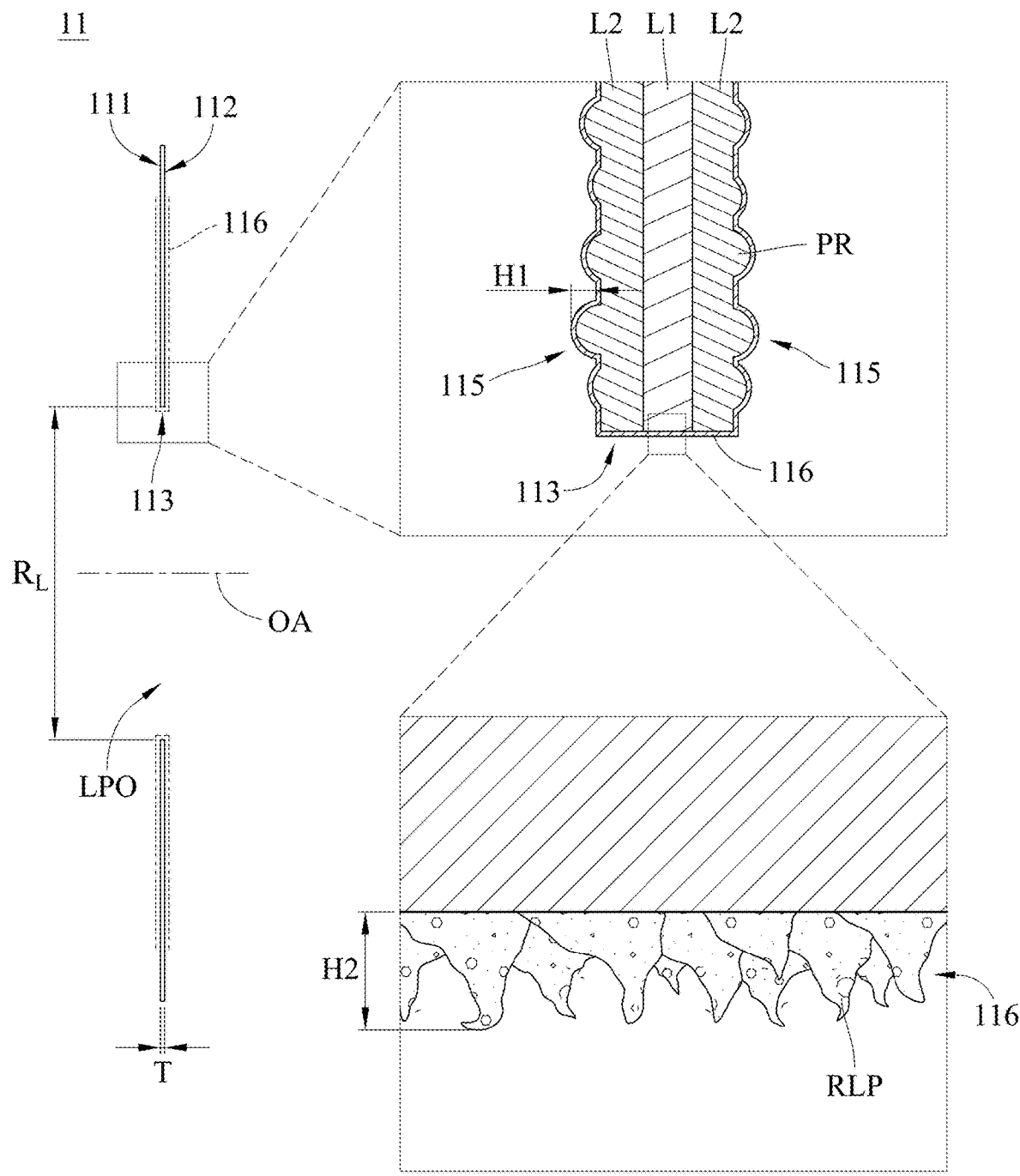
FIG. 5 is a cross-sectional view of the light blocking sheet along line 5-5 in FIG. 2.
Figure 6:
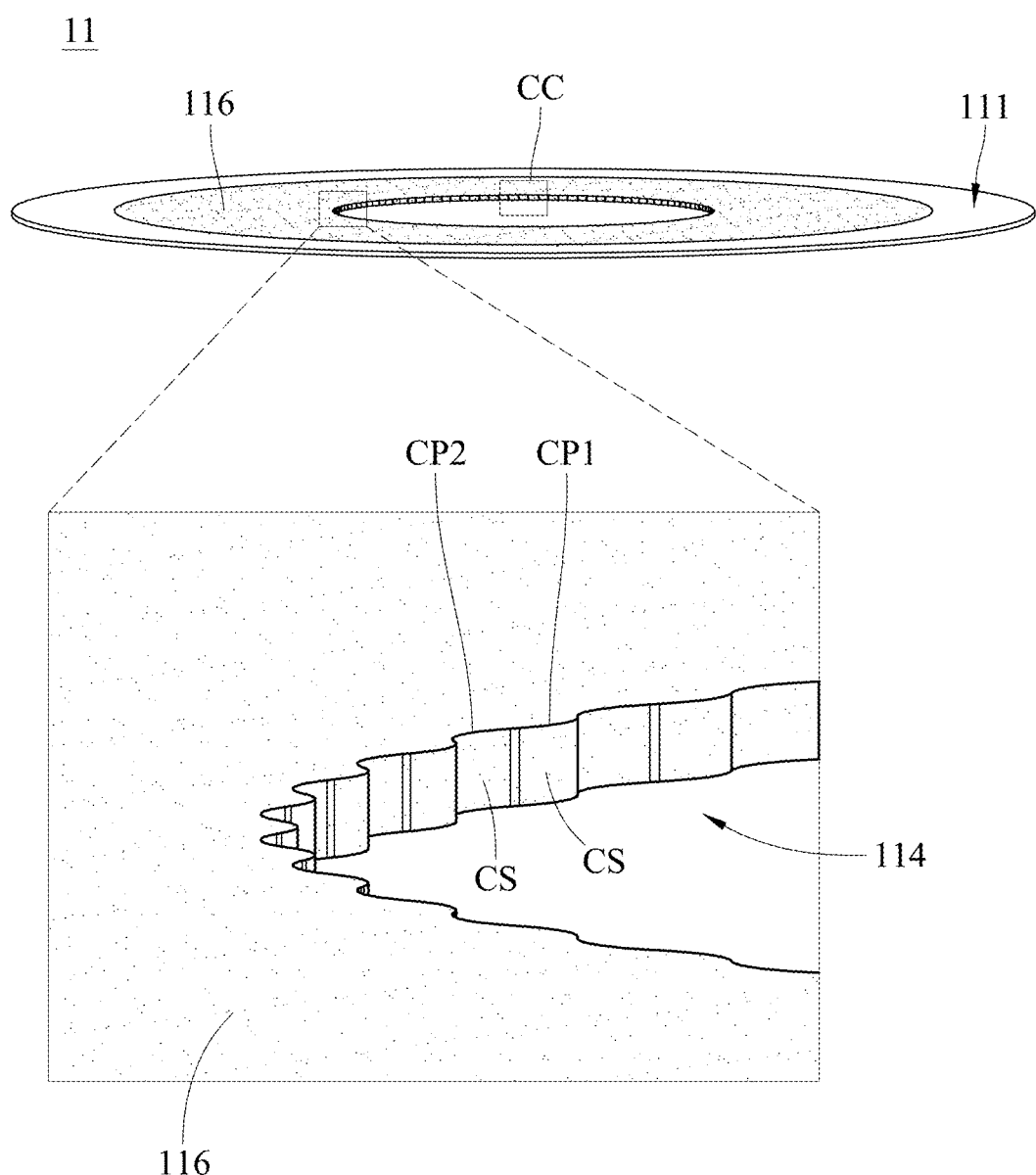
FIG. 6 is a perspective view of the light blocking sheet of the imaging lens in FIG. 1.
Figure 7:
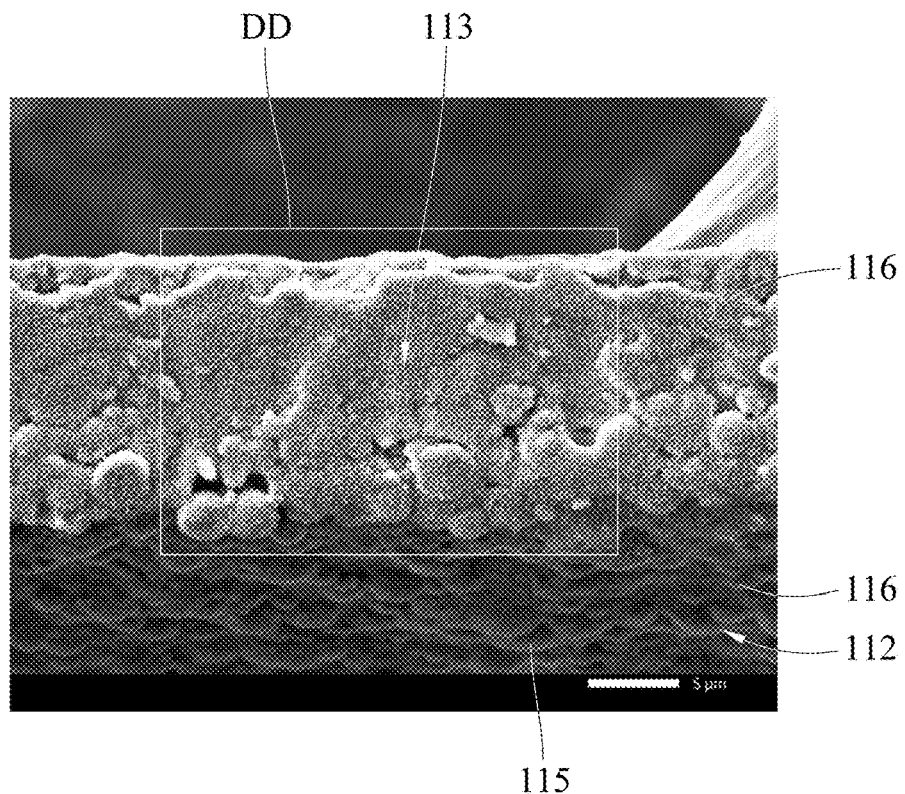
FIG. 7 is a schematic view of CC region of the light blocking sheet in FIG. 6 at a scale of 1:3000.
Figure 8:
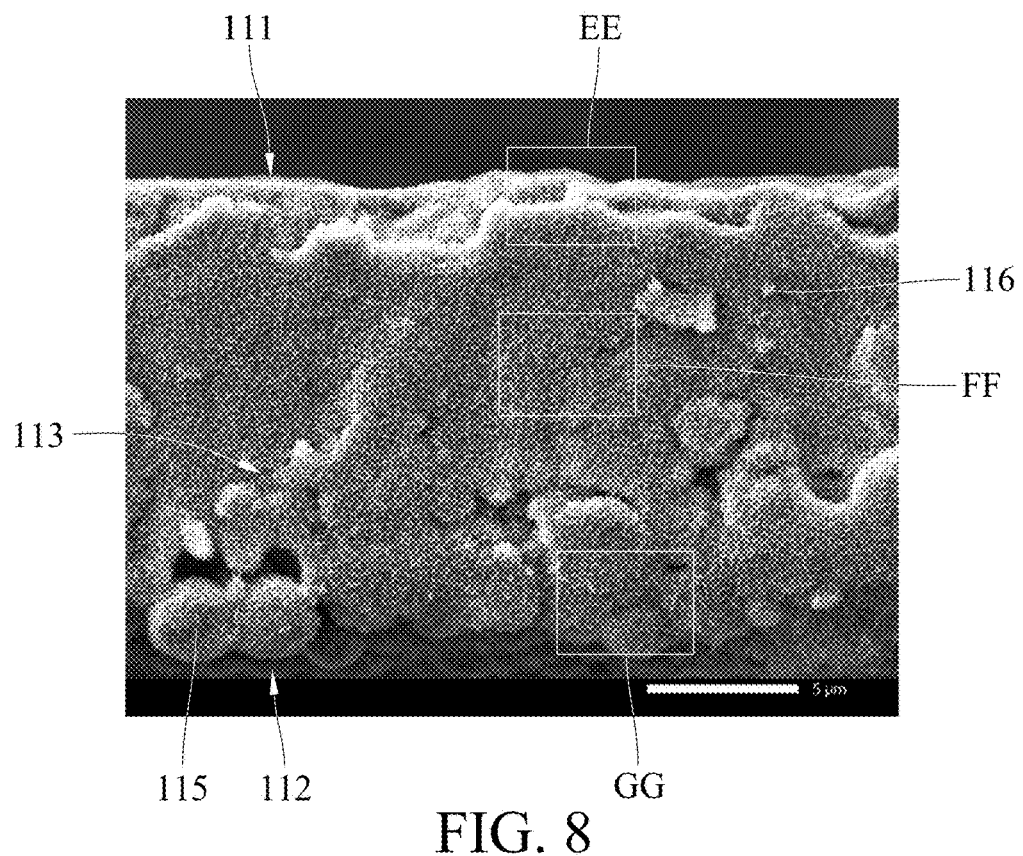
FIG. 8 is a schematic view of DD region of CC region in FIG. 7 at a scale of 1:5000.
Figure 9:
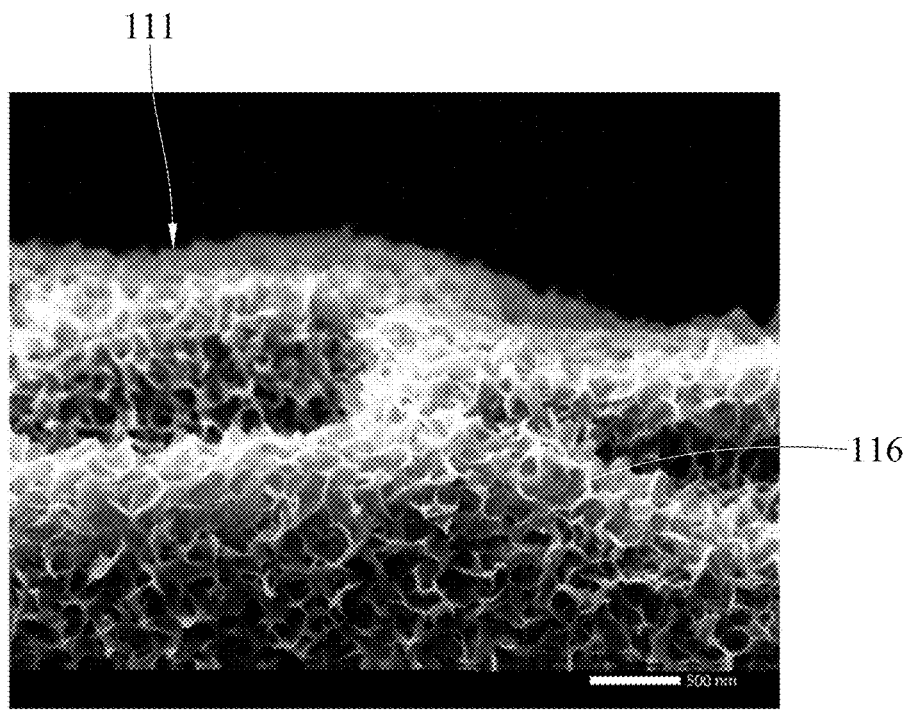
FIG. 9 is a schematic view of EE region of DD region in FIG. 8 at a scale of 1:30000.
Figure 10:
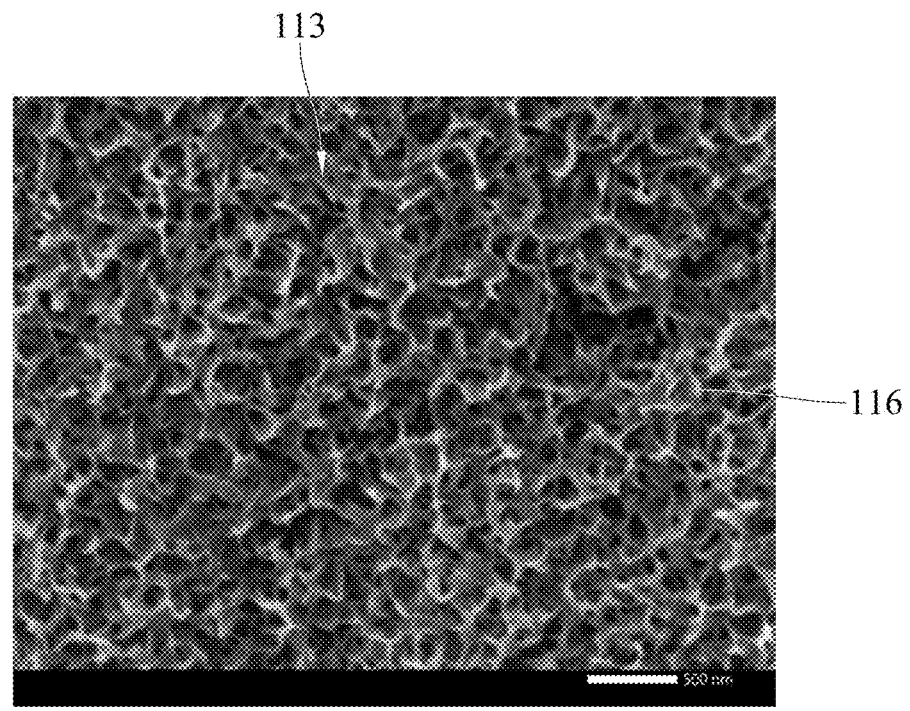
FIG. 10 is a schematic view of FF region of DD region in FIG. 8 at a scale of 1:300000.
Figure 11:
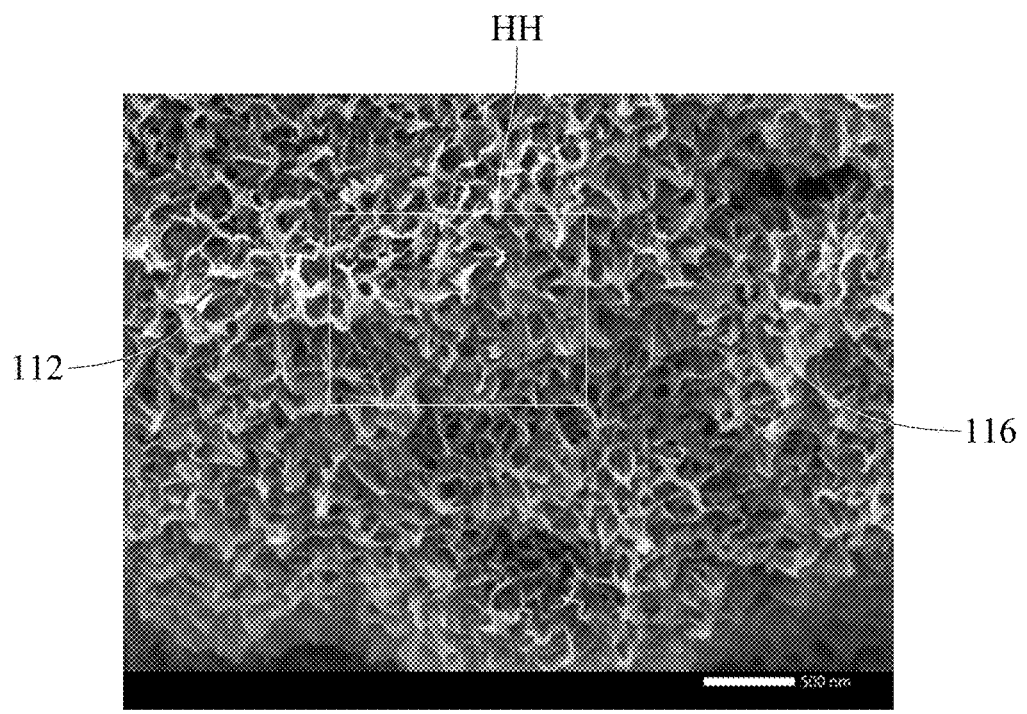
FIG. 11 is a schematic view of GG region of DD region in FIG. 8 at a scale of 1:30000.
Figure 12:
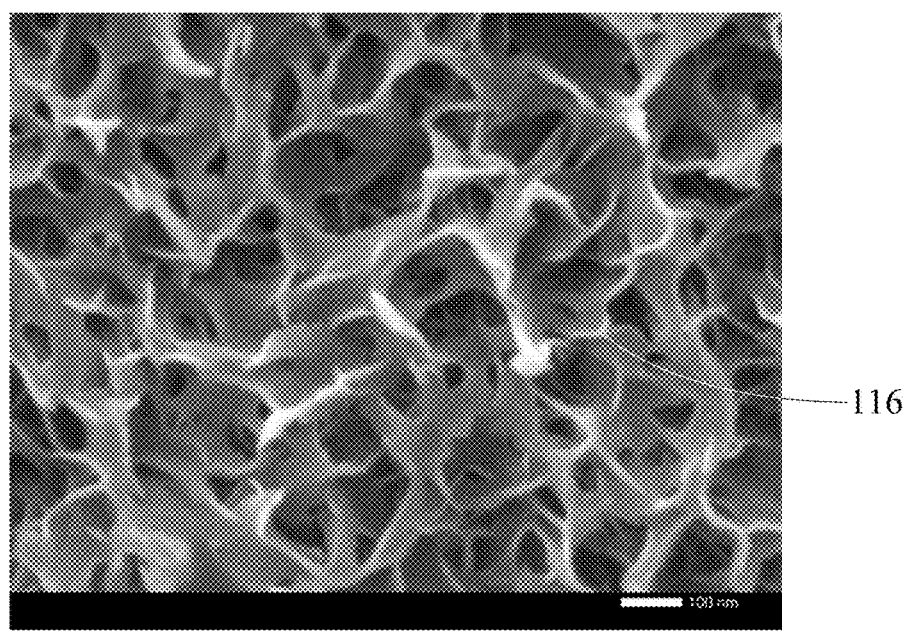
FIG. 12 is a schematic view of HH region of GG region in FIG. 11 at a scale of 1:100000.

Please refer to FIG. 1 to FIG. 12, where FIG. 1 is a cross-sectional view of an imaging lens according to the 1st embodiment of the present disclosure, FIG. 2 is a top view of a light blocking sheet of the imaging lens in FIG. 1, FIG. 3 is a schematic view of AA region of the light blocking sheet in FIG. 2 at a scale of 1:3000, FIG. 4 is a schematic view of BB region of AA region in FIG. 3 at a scale of 1:30000, FIG. 5 is a cross-sectional view of the light blocking sheet along line 5-5 in FIG. 2, FIG. 6 is a perspective view of the light blocking sheet of the imaging lens in FIG. 1, FIG. 7 is a schematic view of CC region of the light blocking sheet in FIG. 6 at a scale of 1:3000, FIG. 8 is a schematic view of DD region of CC region in FIG. 7 at a scale of 1:5000, FIG. 9 is a schematic view of EE region of DD region in FIG. 8 at a scale of 1:30000, FIG. 10 is a schematic view of FF region of DD region in FIG. 8 at a scale of 1:30000, FIG. 11 is a schematic view of GG region of DD region in FIG. 8 at a scale of 1:30000, and FIG. 12 is a schematic view of HH region of GG region in FIG. 11 at a scale of 1:100000.

This embodiment provides an imaging lens 1 through which an optical axis OA passes. The imaging lens 1 includes a light blocking sheet 11, a lens group 12, a lens barrel 13, and an image surface 14. The light blocking sheet 11 and the lens group 12 are accommodated in the lens barrel 13. Light incident into the lens barrel 13 can pass through the light blocking sheet 11 and the lens group 12 to become imaging light projected onto the image surface 14. Please be noted that each element in the lens barrel 13 is not limited to the configuration shown in the drawings.

The light blocking sheet 11 is a multi-layer structure where a substrate layer L1 made of a plastic material is clamped by two cover layers L2 at two opposite sides thereof. The light blocking sheet 11 includes an object-side surface 111, an image-side surface 112, an inner ring surface 113, a plurality of tapered light blocking structures 114, a microstructure 115, and a nanostructure layer 116. The object-side surface 111 is perpendicular to and surrounds the optical axis OA. The image-side surface 112 is opposite to the object-side surface 111, and the image-side surface 112 is located closer to an image side of the imaging lens 1 than the object-side surface 111. The inner ring surface 113 is connected to and located between the object-side surface 111 and the image-side surface 112. The inner ring surface 113 is a cylindrical surface, and the inner ring surface 113 surrounds the optical axis OA and defines a light passage opening LPO.

As shown in FIG. 2, the inner ring surface 113 is able for the tapered light blocking structures 114 to be disposed thereon. Each of the tapered light blocking structures 114 protrudes from the inner ring surface 113 and tapers off towards the optical axis OA, and the tapered light blocking structures 114 are periodically arranged to surround the optical axis OA. The tapered light blocking structures 114 are integrally formed with the remaining part of the light blocking sheet 11.

As shown in FIG. 2, the contour of each of the tapered light blocking structures 114 has a first curved part CP1 and a second curved part CP2 in the view along the optical axis OA. The center of curvature of the first curved part CP1 is located farther away from the optical axis OA than the first curved part CP1. The center of curvature of the second curved part CP2 is located closer to the optical axis OA than the second curved part CP2. The first curved part CP1 and the second curved part CP2 are indirectly connected to each other with an additional straight line (not numbered) therebetween. The first curved part CP1 is located closer to the optical axis OA than the second curved part CP2, and each of the first curved part CP1 and the second curved part CP2 forms a curved surface CS on the inner ring surface 113. Also, the second curved part CP2 is connected to another first curved part CP1 of another tapered light blocking structure 114 adjacent thereto with an additional straight line therebetween. It can be considered that the first curved parts CP1 and the second curved parts CP2 are alternately arranged.

As shown in FIG. 5, the microstructure 115 is disposed on the object-side surface 111 and the image-side surface 112 of the light blocking sheet 11 rather than disposed on the inner ring surface 113. The microstructure 115 has a plurality of protrusions PR, and a structure height of the microstructure 115 is H1. The average structure height of at least three or more protrusions PR among the microstructure 115 ranges from 0.25 micrometers to 19 micrometers. Each protrusion PR of the microstructure 115 is arc-shaped in the cross-sectional view of the light blocking sheet 11.

As shown in FIG. 2, FIG. 5, and FIG. 6, the nanostructure layer 116 is disposed on the tapered light blocking structures 114 where the inner ring surface 113 is disposed (including the curved surfaces CS formed by the first curved part CP1 and the second curved part CP2), and the nanostructure layer 116 can be further disposed on the object-side surface 111 and the image-side surface 112 and can be evenly distributed on the microstructure 115. It can be considered that the nanostructure layer 116 is disposed on the tapered light blocking structures 114 on the inner ring surface 113 and on the microstructure 115 on the object-side surface 111 and the image-side surface 112. Please refer to FIG. 5, the nanostructure layer 116 has a plurality of ridge-like protrusions RLP that extend non-directionally from the curved surfaces CS, and a structure height of the nanostructure layer 116 is a vertical height H2 from an absolute bottom (foot of the mountain) of the ridge-like protrusions RLP to a top (mountaintop) of the ridge-like protrusions RLP in the cross-sectional view of the nanostructure layer 116 (destructive measurement); alternatively, please refer to FIG. 4, a structure height of the nanostructure layer 116 can also be a vertical height H3 from a relatively bottom (valley between two mountains) of the ridge-like protrusions RLP to the top (mountaintop) of the ridge-like protrusions RLP in the side view of the nanostructure layer 116 (non-destructive measurement). However, the present disclosure is not limited thereto. The average structure height of at least three or more ridge-like protrusions RLP among the nanostructure layer 116 ranges from 98 nanometers to 350 nanometers. The ridge-like protrusions RLP are wide at the bottom side and narrow at the top side thereof in the cross-sectional view of the light blocking sheet 11, which can allow the equivalent refractive index of the nanostructure layer 116 to gradually decrease from the bottom side to the top side and can form a rough surface so as to reduce reflection of stray light.

Please refer to Table 1, which shows the structure heights H3 of the ridge-like protrusions RLP of the nanostructure layer 116 in FIG. 4.

TABLE 1 structure heights in the 1st embodiment

| | ridge-like protrusion | | |
|---|---|---|---|
| | RLP-1 | RLP-2 | RLP-3 |
| structure height | 143.6 nm | 143.1 nm | 131.5 nm |

When a thickness of the light blocking sheet 11 is T, the following condition is satisfied: T=23 [um].

When the quantity of the plurality of tapered light blocking structures 114 is N, the following condition is satisfied: N=60.

When a curvature radius of the first curved part CP1 is $R_{VC}$, a curvature radius of the second curved part CP2 is $R_C$, and a radius of the light passage opening LPO is $R_L$, the following conditions are satisfied: $R_{VC}$=0.05 [mm]; $R_C$=0.05 [mm]; $R_L$=0.917 [mm]; $R_C/R_{VC}$=1; $(R_{VC}/R_L) \times 1.02\pi^4$=5.42; and $(R_C/R_L) \times 1.02\pi^4$=5.42.

When an average reflectivity of the object-side surface 111 and the image-side surface 112 where the nanostructure layer 116 is disposed for light with a wavelength ranging from 750 nanometers to 900 nanometers is $R_{7590}$, the following condition is satisfied: $R_{7590} \leq 0.65\%$. When an average reflectivity of the object-side surface 111 and the image-side surface 112 where the nanostructure layer 116 is disposed for light with a wavelength ranging from 380 nanometers to 400 nanometers is $R_{3840}$, the following condition is satisfied: $R_{3840} \leq 0.75\%$. When an average reflectivity of the object-side surface 111 and the image-side surface 112 where the nanostructure layer 116 is disposed for light with a wavelength ranging from 400 nanometers to 700 nanometers is $R_{4070}$, the following condition is satisfied: $R_{4070} \leq 0.5\%$.

2nd Embodiment

Figure 13:
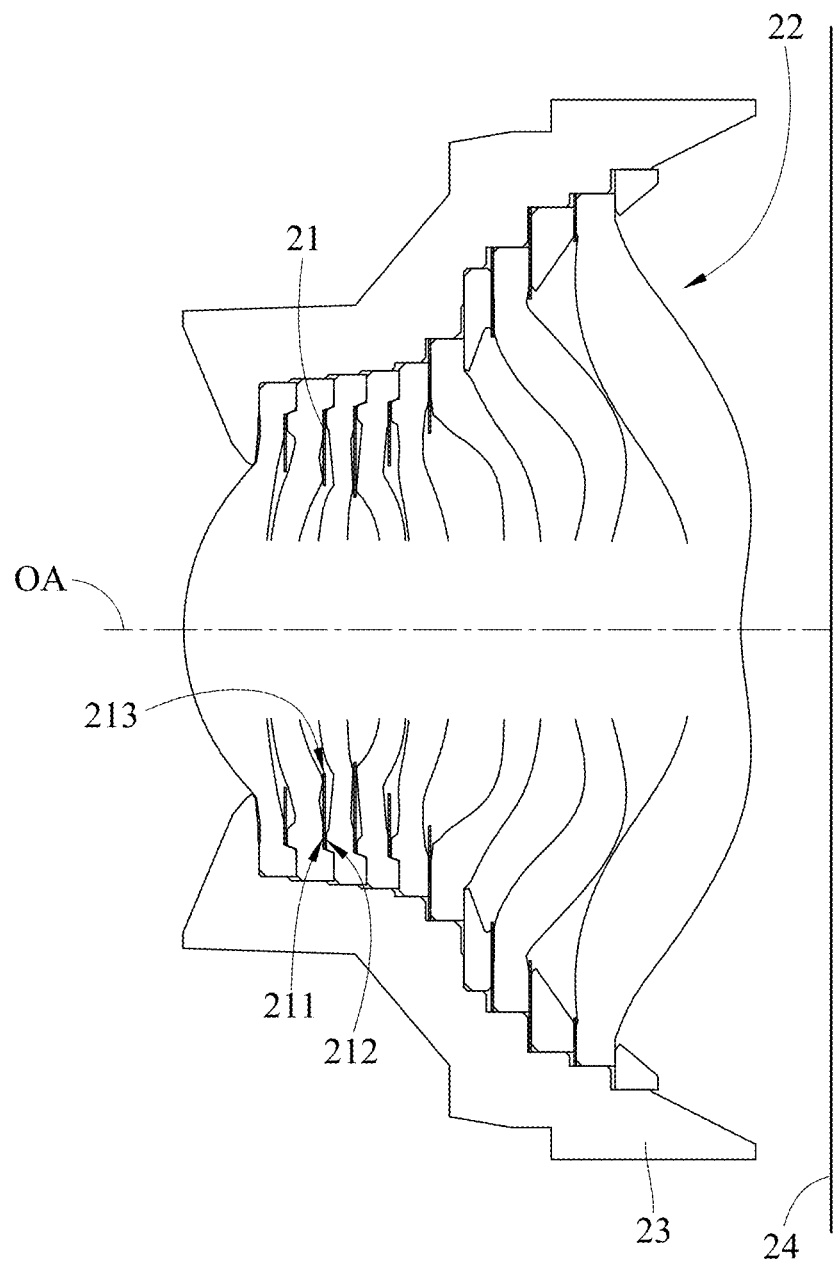
FIG. 13 is a cross-sectional view of an imaging lens according to the 2nd embodiment of the present disclosure.
Figure 14:
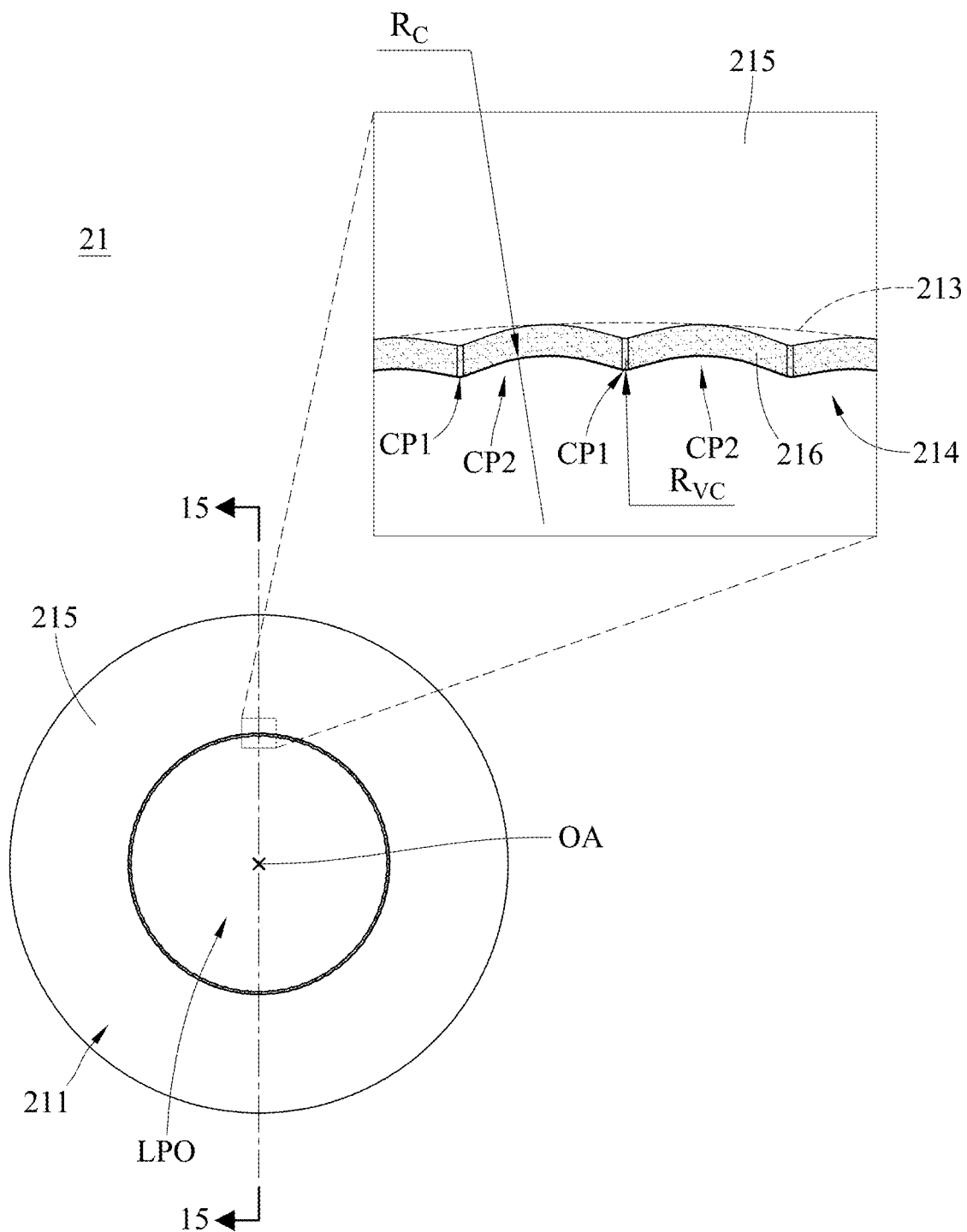
FIG. 14 is a top view of a light blocking sheet of the imaging lens in FIG. 13.
Figure 15:
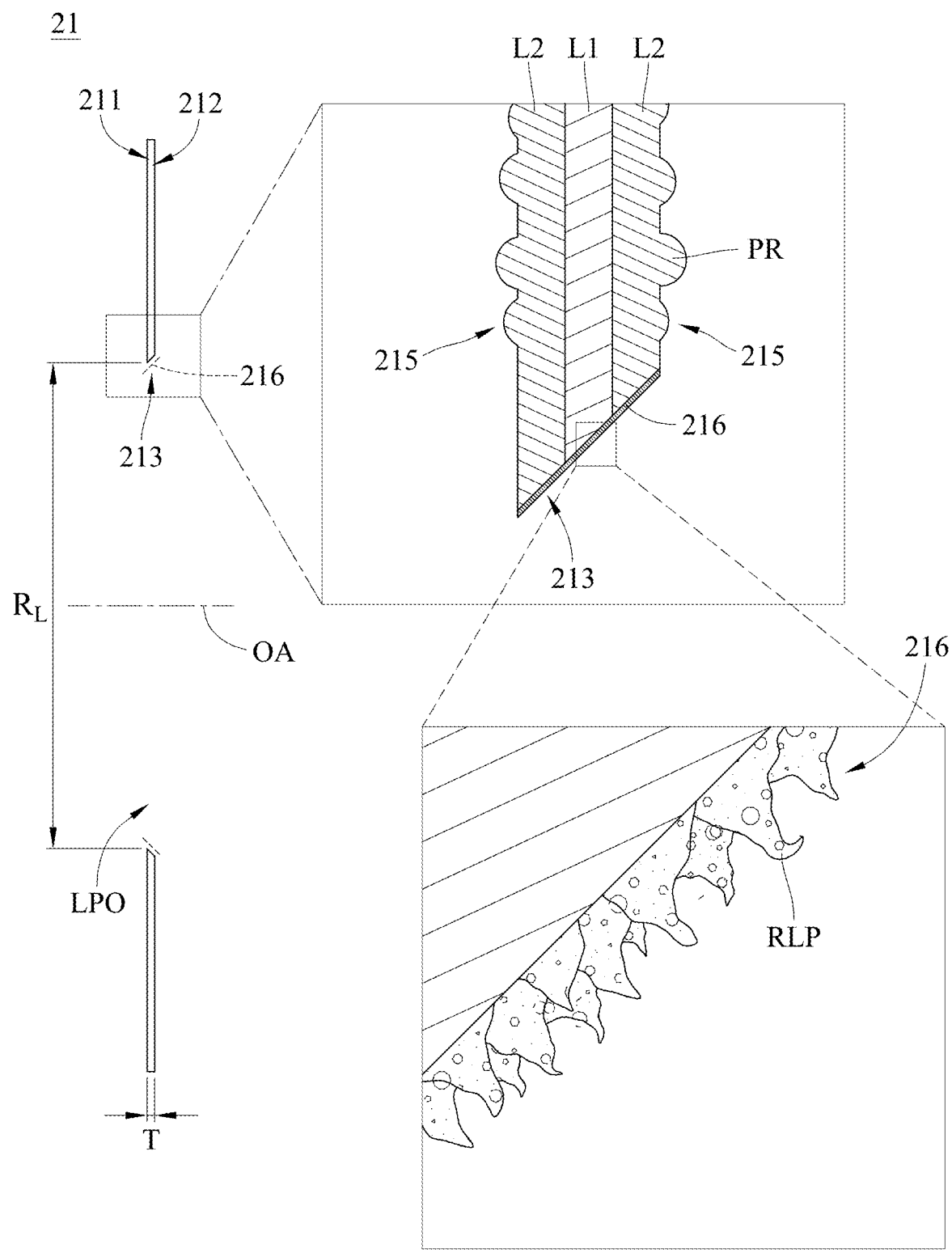
FIG. 15 is a cross-sectional view of the light blocking sheet along line 15-15 in FIG. 14.

Please refer to FIG. 13 to FIG. 15, where FIG. 13 is a cross-sectional view of an imaging lens according to the 2nd embodiment of the present disclosure, FIG. 14 is a top view of a light blocking sheet of the imaging lens in FIG. 13, and FIG. 15 is a cross-sectional view of the light blocking sheet along line 15-15 in FIG. 14.

This embodiment provides an imaging lens 2 through which an optical axis OA passes. The imaging lens 2 includes a light blocking sheet 21, a lens group 22, a lens barrel 23, and an image surface 24. The light blocking sheet 21 and the lens group 22 are accommodated in the lens barrel 23. Light incident into the lens barrel 23 can pass through the light blocking sheet 21 and the lens group 22 to become imaging light projected onto the image surface 24. Please be noted that each element in the lens barrel 23 is not limited to the configuration shown in the drawings.

The light blocking sheet 21 is a multi-layer structure where a substrate layer L1 made of a plastic material is clamped by two cover layers L2 at two opposite sides thereof. The light blocking sheet 21 includes an object-side surface 211, an image-side surface 212, an inner ring surface 213, a plurality of tapered light blocking structures 214, a microstructure 215, and a nanostructure layer 216. The object-side surface 211 is perpendicular to and surrounds the optical axis OA. The image-side surface 212 is opposite to the object-side surface 211, and the image-side surface 212 is located closer to an image side of the imaging lens 2 than the object-side surface 211. The inner ring surface 213 is connected to and located between the object-side surface 211 and the image-side surface 212. The inner ring surface 213 is a single-side-tapered surface, and the inner ring surface 213 surrounds the optical axis OA and defines a light passage opening LPO by its tip-end close to an object side of the imaging lens 2.

As shown in FIG. 14, the inner ring surface 213 is able for the tapered light blocking structures 214 to be disposed thereon. Each of the tapered light blocking structures 214 protrudes from the inner ring surface 213 and tapers off towards the optical axis OA, and the tapered light blocking structures 214 are periodically arranged to surround the optical axis OA. The tapered light blocking structures 214 are integrally formed with the remaining part of the light blocking sheet 21.

As shown in FIG. 14, the contour of each of the tapered light blocking structures 214 has a first curved part CP1 and a second curved part CP2 in the view along the optical axis OA. The center of curvature of the first curved part CP1 is located farther away from the optical axis OA than the first curved part CP1. The center of curvature of the second curved part CP2 is located closer to the optical axis OA than the second curved part CP2. The first curved part CP1 and the second curved part CP2 are directly connected to each other. The first curved part CP1 is located closer to the optical axis OA than the second curved part CP2, and each of the first curved part CP1 and the second curved part CP2 forms a curved surface (not numbered) on the inner ring surface 213. Also, the second curved part CP2 is connected to another first curved part CP1 of another tapered light blocking structure 214 adjacent thereto. It can be considered that the first curved parts CP1 and the second curved parts CP2 are alternately arranged.

As shown in FIG. 15, the microstructure 215 is disposed on the object-side surface 211 and the image-side surface 212 of the light blocking sheet 21 rather than disposed on the inner ring surface 213. The microstructure 215 has a plurality of protrusions PR, and the average structure height of at least three or more protrusions PR among the microstructure 215 ranges from 0.25 micrometers to 19 micrometers. Each protrusion PR of the microstructure 215 is arc-shaped in the cross-sectional view of the light blocking sheet 21.

As shown in FIG. 14 and FIG. 15, the nanostructure layer 216 is disposed on the tapered light blocking structures 214 where the inner ring surface 213 is disposed (including the curved surfaces formed by the first curved part CP1 and the second curved part CP2). It can be considered that the nanostructure layer 216 is only disposed on the tapered light blocking structures 214 on the inner ring surface 213. Please refer to FIG. 15, the nanostructure layer 216 has a plurality of ridge-like protrusions RLP that extend non-directionally from the curved surfaces, and the average structure height of at least three or more ridge-like protrusions RLP among the nanostructure layer 216 ranges from 98 nanometers to 350 nanometers.

When a thickness of the light blocking sheet 21 is T, the following condition is satisfied: T=16 [um].

When the quantity of the plurality of tapered light blocking structures 214 is N, the following condition is satisfied: N=72.

When a curvature radius of the first curved part CP1 is $R_{VC}$, a curvature radius of the second curved part CP2 is $R_C$, and a radius of the light passage opening LPO is $R_L$, the following conditions are satisfied: $R_{VC}$=0.01 [mm]; $R_C$=0.14 [mm]; $R_L$=1.6 [mm]; $R_C/R_{VC}$=14; $(R_{VC}/R_L) \times 1.02\pi^4$=0.62; and $(R_C/R_L) \times 1.02\pi^4$=8.69.

3rd Embodiment

Figure 17:
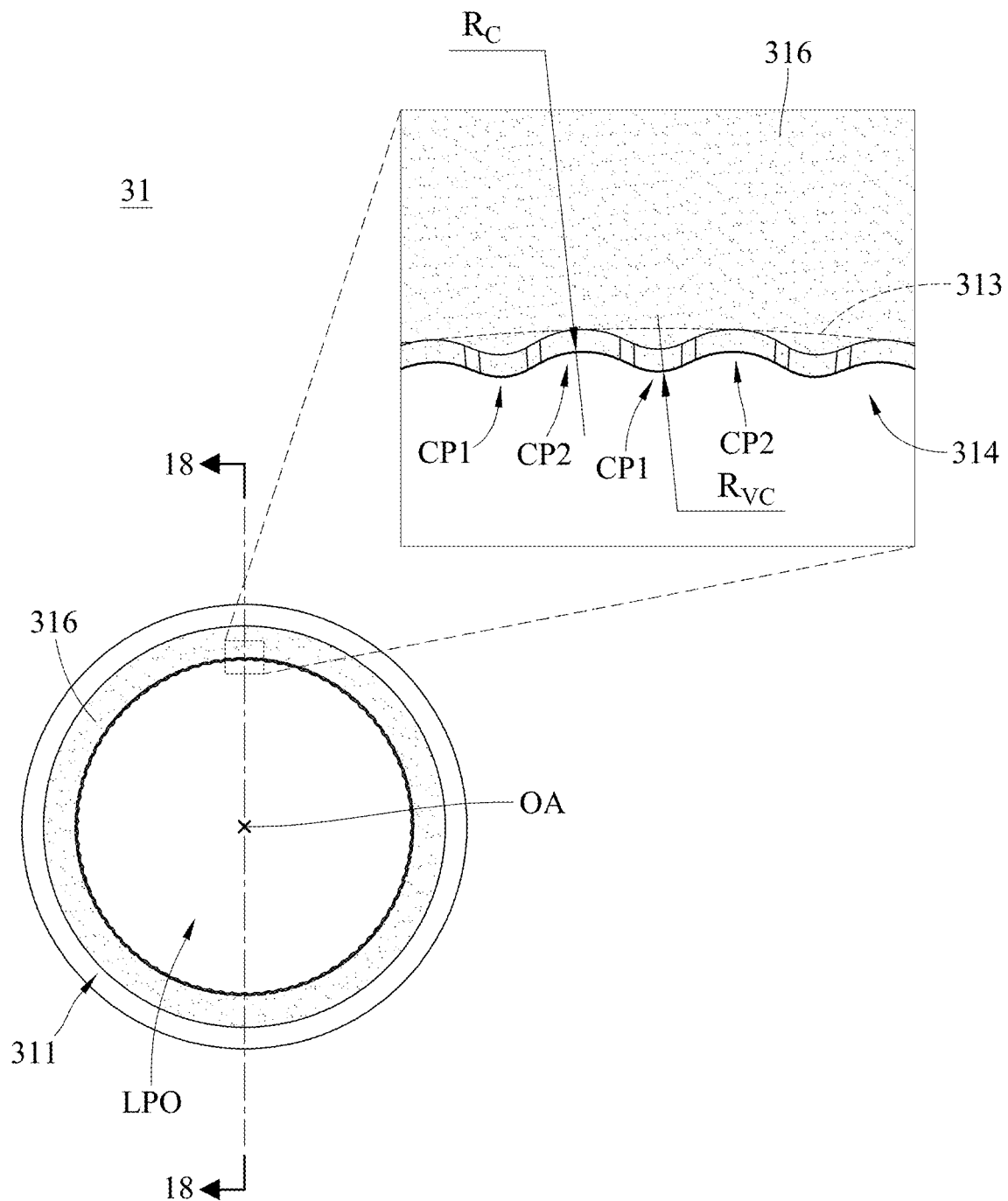
FIG. 17 is a top view of a light blocking sheet of the imaging lens in FIG. 16.
Figure 18:
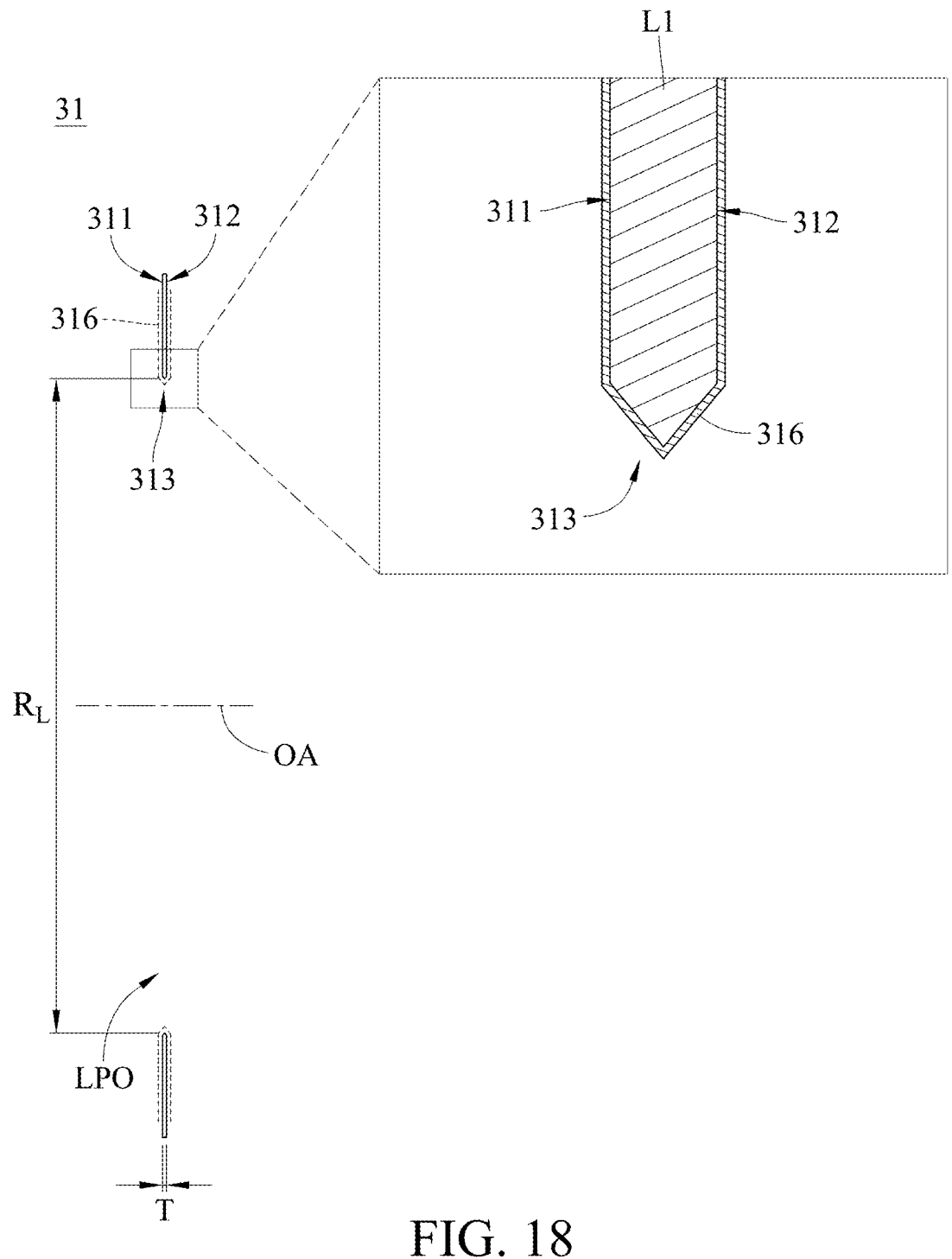
FIG. 18 is a cross-sectional view of the light blocking sheet along line 18-18 in FIG. 17.
Figure 19:
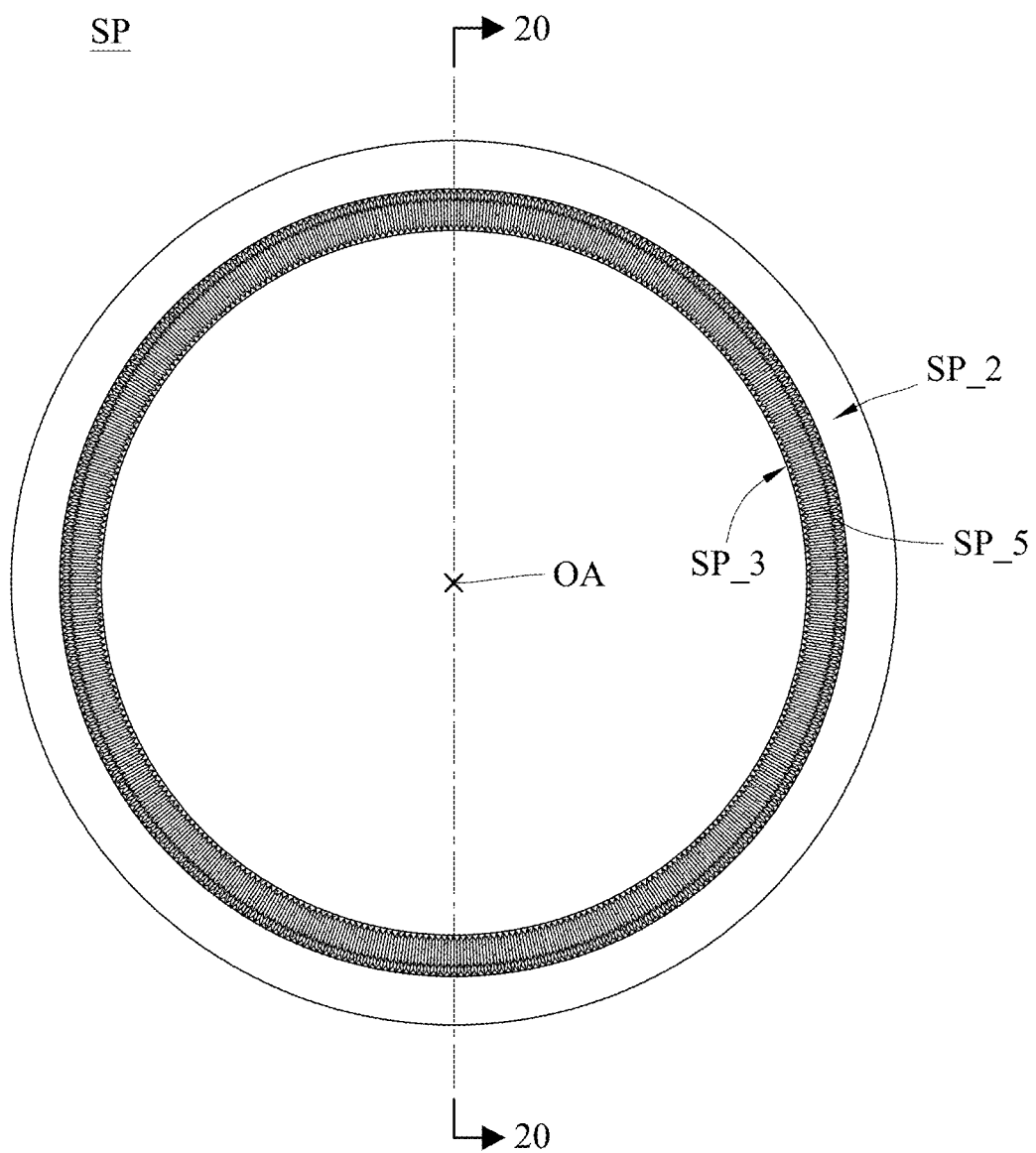
FIG. 19 is a bottom view of a spacer of the imaging lens in FIG. 16.
Figure 20:
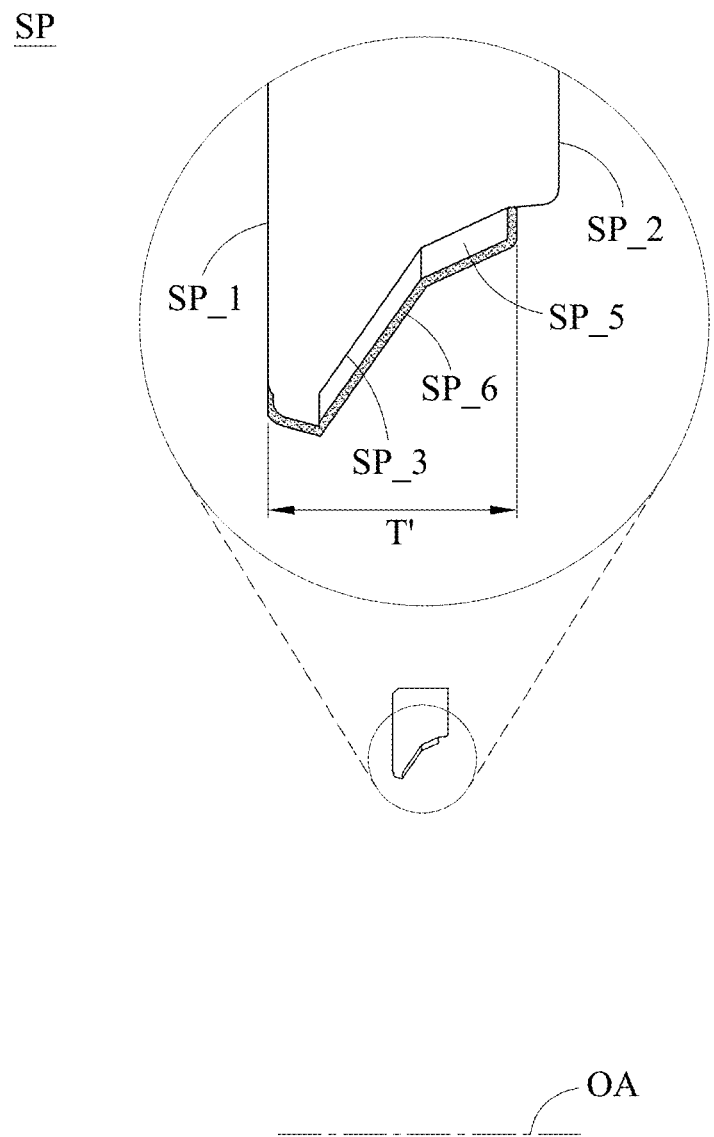
FIG. 20 is a cross-sectional view of the spacer along line 20-20 in FIG. 19.
Figure 20:
Figure 21:
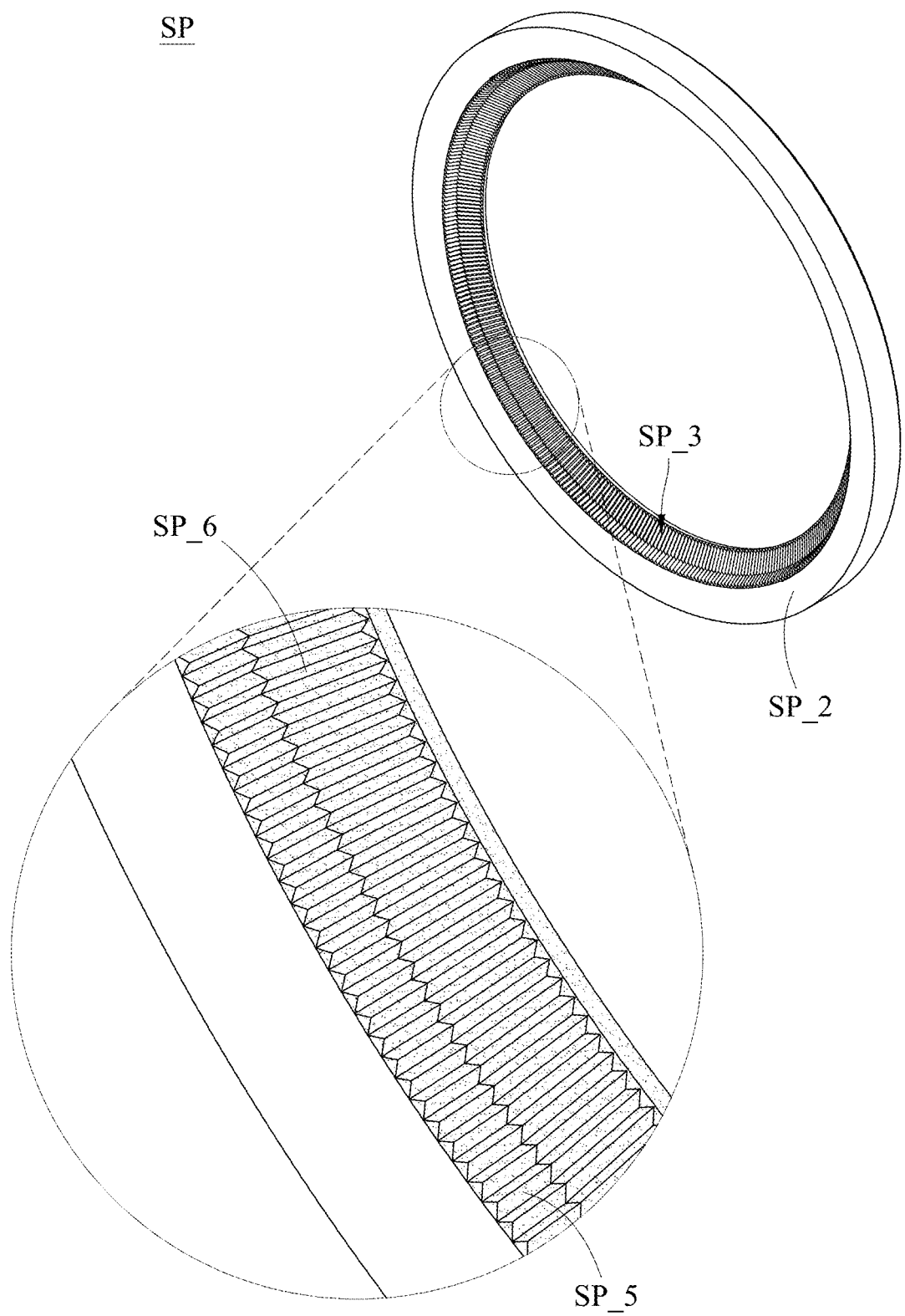
FIG. 21 is a perspective view of the spacer of the imaging lens in FIG. 16.

Please refer to FIG. 16 to FIG. 21, where FIG. 16 is a cross-sectional view of an imaging lens according to the 3rd embodiment of the present disclosure, FIG. 17 is a top view of a light blocking sheet of the imaging lens in FIG. 16, FIG. 18 is a cross-sectional view of the light blocking sheet along line 18-18 in FIG. 17, FIG. 19 is a bottom view of a spacer of the imaging lens in FIG. 16, FIG. 20 is a cross-sectional view of the spacer along line 20-20 in FIG. 19, and FIG. 21 is a perspective view of the spacer of the imaging lens in FIG. 16.

This embodiment provides an imaging lens 3 through which an optical axis OA passes. The imaging lens 3 includes a light blocking sheet 31, a lens group 32, a spacer SP, a retainer RT, a lens barrel 33, and an image surface 34. The light blocking sheet 31, the lens group 32, the spacer SP, and the retainer RT are accommodated in the lens barrel 33. Light incident into the lens barrel 33 can pass through the light blocking sheet 31, the lens group 32, the spacer SP, and the retainer RT to become imaging light projected onto the image surface 34. Please be noted that each element in the lens barrel 33 is not limited to the configuration shown in the drawings.

The light blocking sheet 31 is a single-layer structure where a substrate layer L1 made of metallic material is coated by black pigment (not shown). The light blocking sheet 31 includes an object-side surface 311, an image-side surface 312, an inner ring surface 313, a plurality of tapered light blocking structures 314, and a nanostructure layer 316. The object-side surface 311 is perpendicular to and surrounds the optical axis OA. The image-side surface 312 is opposite to the object-side surface 311, and the image-side surface 312 is located closer to an image side of the imaging lens 3 than the object-side surface 311. The inner ring surface 313 is connected to and located between the object-side surface 311 and the image-side surface 312. The inner ring surface 313 is a double-side-tapered surface, and the inner ring surface 313 surrounds the optical axis OA and defines a light passage opening LPO by its tip-end at the center part thereof.

As shown in FIG. 17, the inner ring surface 313 is able for the tapered light blocking structures 314 to be disposed thereon. Each of the tapered light blocking structures 314 protrudes from the inner ring surface 313 and tapers off towards the optical axis OA, and the tapered light blocking structures 314 are periodically arranged to surround the optical axis OA. The tapered light blocking structures 314 are integrally formed with the remaining part of the light blocking sheet 31.

As shown in FIG. 17, the contour of each of the tapered light blocking structures 314 has a first curved part CP1 and a second curved part CP2 in the view along the optical axis OA. The center of curvature of the first curved part CP1 is located farther away from the optical axis OA than the first curved part CP1. The center of curvature of the second curved part CP2 is located closer to the optical axis OA than the second curved part CP2. The first curved part CP1 and the second curved part CP2 are indirectly connected to each other with an additional straight line (not numbered) therebetween. The first curved part CP1 is located closer to the optical axis OA than the second curved part CP2, and each of the first curved part CP1 and the second curved part CP2 forms a curved surface (not numbered) on the inner ring surface 313. Also, the second curved part CP2 is connected to another first curved part CP1 of another tapered light blocking structure 314 adjacent thereto with an additional straight line therebetween. It can be considered that the first curved parts CP1 and the second curved parts CP2 are alternately arranged.

As shown in FIG. 17 and FIG. 18, the nanostructure layer 316 is disposed on the tapered light blocking structure 314 where the inner ring surface 313 is disposed (including the curved surfaces formed by the first curved part CP1 and the second curved part CP2), and the nanostructure layer 316 can be further disposed on the object-side surface 311 and the image-side surface 312. It can be considered that the nanostructure layer 316 is disposed on the tapered light blocking structures 314 on the inner ring surface 313 and on the object-side surface 311 and the image-side surface 312. The nanostructure layer 316 has a plurality of ridge-like protrusions (not shown) that extend non-directionally from the curved surfaces, and the average structure height of at least three or more ridge-like protrusions RLP among the nanostructure layer 316 ranges from 98 nanometers to 350 nanometers.

When a thickness of the light blocking sheet 31 is T, the following condition is satisfied: T=20 [um].

When the quantity of the plurality of tapered light blocking structures 314 is N, the following condition is satisfied: N=90.

When a curvature radius of the first curved part CP1 is $R_{VC}$, a curvature radius of the second curved part CP2 is $R_C$, and a radius of the light passage opening LPO is $R_L$, the following conditions are satisfied: $R_{VC}$=0.05 [mm]; $R_C$=0.075 [mm]; $R_L$=1.98 [mm]; $R_C/R_{VC}$=1.5; $(R_{VC}/R_L) \times 1.02\pi^4$=2.51; and $(R_C/R_L) \times 1.02\pi^4$=3.76. When an average reflectivity of the object-side surface 311 and the image-side surface 312 where the nanostructure layer 316 is disposed for light with a wavelength ranging from 750 nanometers to 900 nanometers is $R_{7590}$, the following condition is satisfied: $R_{7590} \leq 0.65\%$. When an average reflectivity of the object-side surface 311 and the image-side surface 312 where the nanostructure layer 316 is disposed for light with a wavelength ranging from 380 nanometers to 400 nanometers is $R_{3840}$, the following condition is satisfied: $R_{3840} \leq 0.75\%$. When an average reflectivity of the object-side surface 311 and the image-side surface 312 where the nanostructure layer 316 is disposed for light with a wavelength ranging from 400 nanometers to 700 nanometers is $R_{4070}$, the following condition is satisfied: $R_{4070} \leq 0.5\%$.

The lens group 32 includes a first lens element 321 and a second lens element 322, and the light blocking sheet 31, the first lens element 321, and the second lens element 322 are sequentially arranged along the optical axis OA from an object side to the image side of the imaging lens 3.

The lens barrel 33 includes a cylindrical portion 331 and a plate portion 332. The cylindrical portion 331 surrounds about the optical axis OA. The plate portion 332 is connected to the cylindrical portion 331, and the plate portion 332 extends towards the optical axis OA and forms an aperture stop AS. The plate portion 332 has an abut surface 3321 and an inner wall surface 3322. The abut surface 3321 is in physical contact with the light blocking sheet 31. The inner wall surface 3322 extends towards the abut surface 3321 from the aperture stop AS. The inner wall surface 3322 is spaced apart from the light blocking sheet 31 by a distance D along a direction in parallel with the optical axis OA, and the distance D gradually decreases along a direction away from the optical axis OA.

When a maximum value of the distance D is Dmax, and a central thickness of the second lens element 322 is CT2, the following conditions are satisfied: Dmax=0.47 [mm]; CT2=0.255 [mm]; and Dmax/CT2=1.843.

The spacer SP can also be provided with a structure similar to the abovementioned nanostructure layer 316 so as to further reduce reflection of stray light in the lens barrel 33. Specifically, the spacer SP includes an object-side surface SP_1, an image-side surface SP_2, an inner ring surface SP_3, a microstructure SP_5, and a nanostructure layer SP_6. The object-side surface SP_1 is perpendicular to and surrounds the optical axis OA. The image-side surface SP_2 is opposite to the object-side surface SP_1, and the image-side surface SP_2 is located closer to the image side of the imaging lens 3 than the object-side surface SP_1. The inner ring surface SP_3 is connected to and located between the object-side surface SP_1 and the image-side surface SP_2. The inner ring surface SP_3 surrounds the optical axis OA and is served as the minimum opening of the spacer SP to define a light passage opening (not numbered).

As shown in FIG. 19, FIG. 20, and FIG. 21, the inner ring surface SP_3 is able for the microstructure SP_5 to be disposed thereon. As shown in FIG. 19 and FIG. 21, the microstructure SP_5 has a plurality of triangular protrusions (not numbered) that are periodically arranged about the optical axis OA along a circumferential direction of the spacer SP.

As shown in FIG. 20 and FIG. 21, the nanostructure layer SP_6 is disposed on the inner ring surface SP_3 to cover and be in physical contact with the microstructure SP_5 on the inner ring surface SP_3.

As shown in FIG. 20 and FIG. 21, the nanostructure layer SP_6 is evenly distributed on the microstructure SP_5 and maintains the shape of the microstructure SP_5.

The retainer RT can also be provided with a structure similar to the abovementioned nanostructure layer 316 or nanostructure layer SP_6, and the similar description will be omitted.

4th Embodiment

Figure 23:
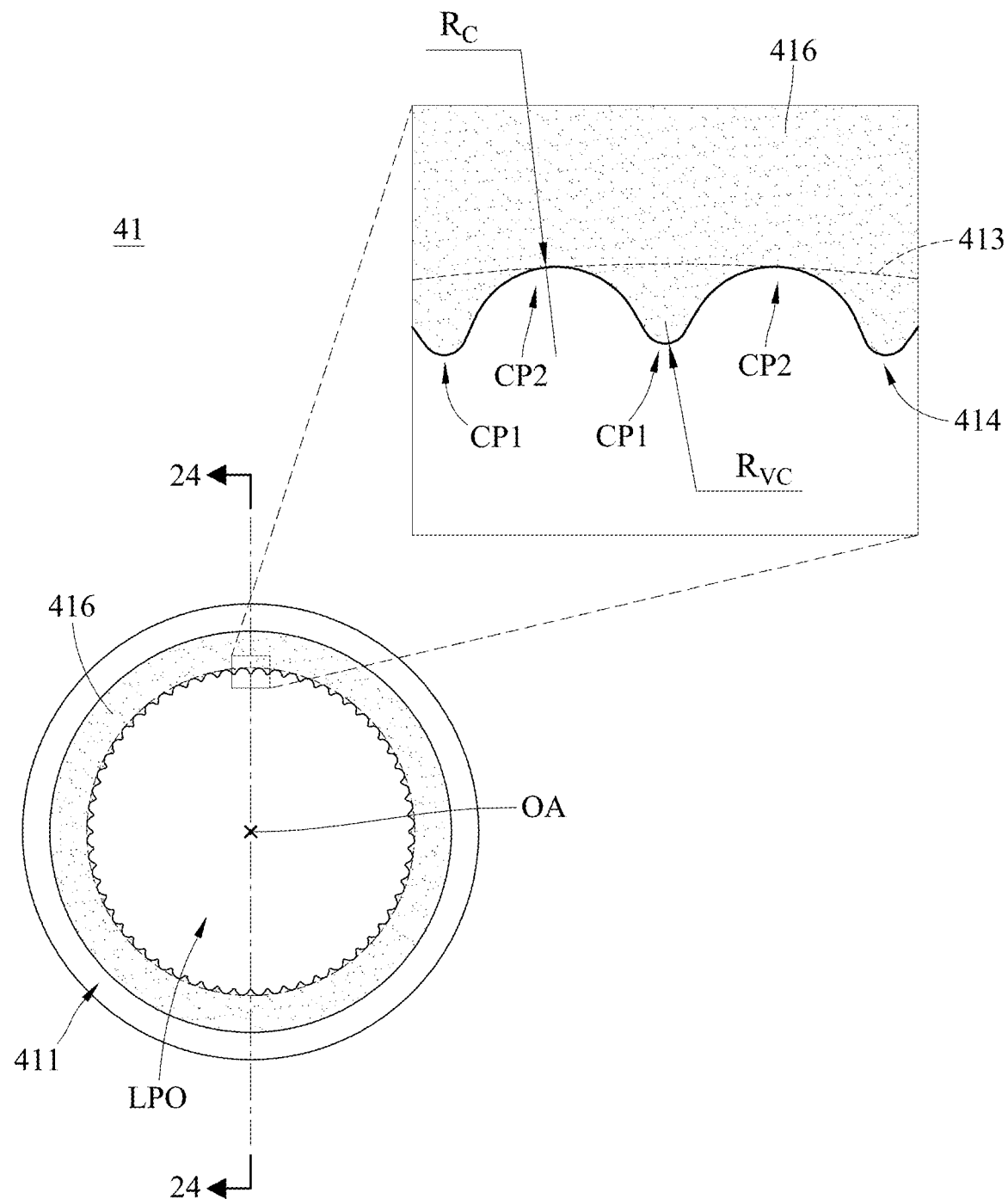
FIG. 23 is a top view of a light blocking sheet of the imaging lens in FIG. 22.
Figure 24:
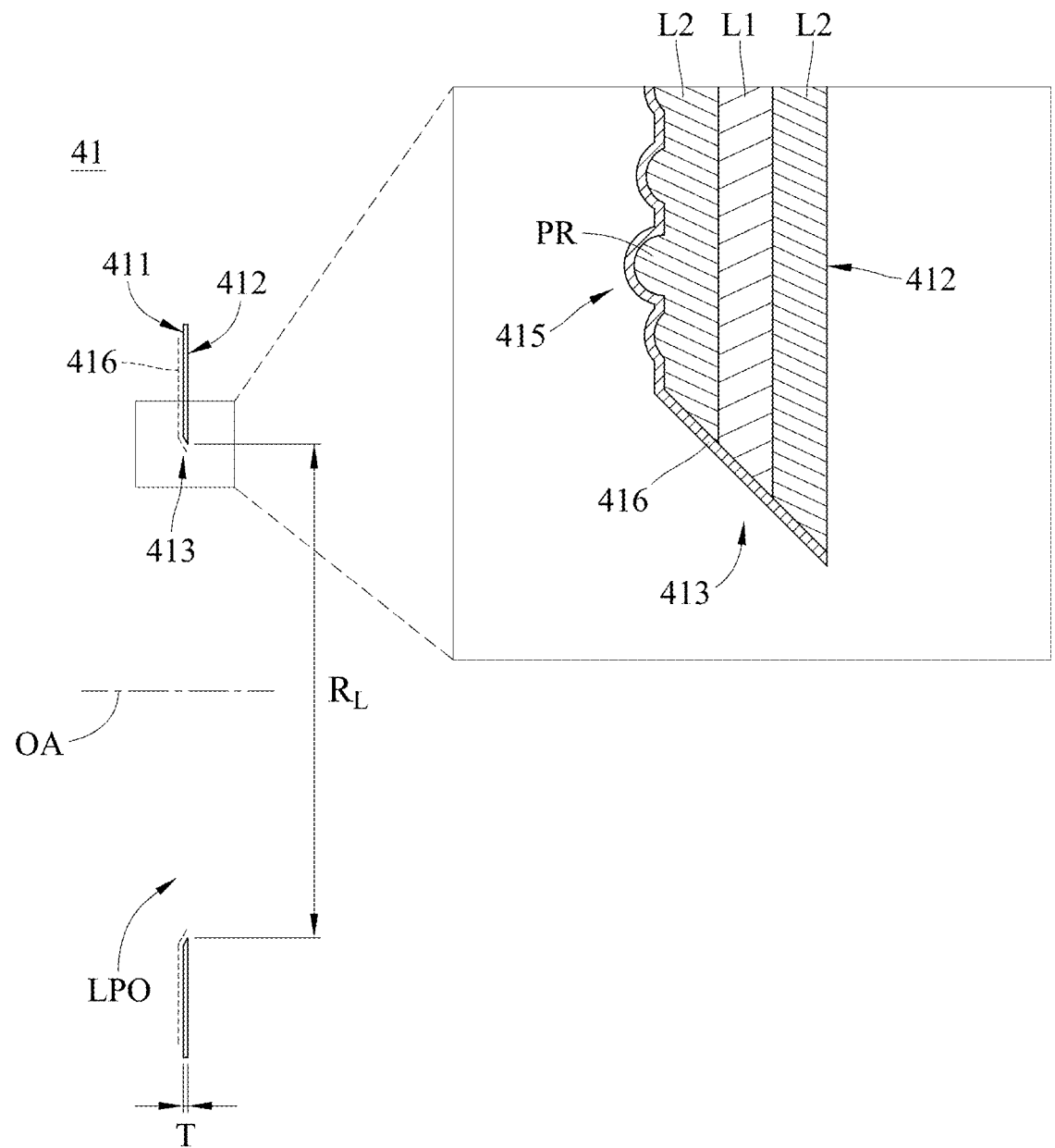
FIG. 24 is a cross-sectional view of the light blocking sheet along line 24-24 in FIG. 23.
Figure 25:
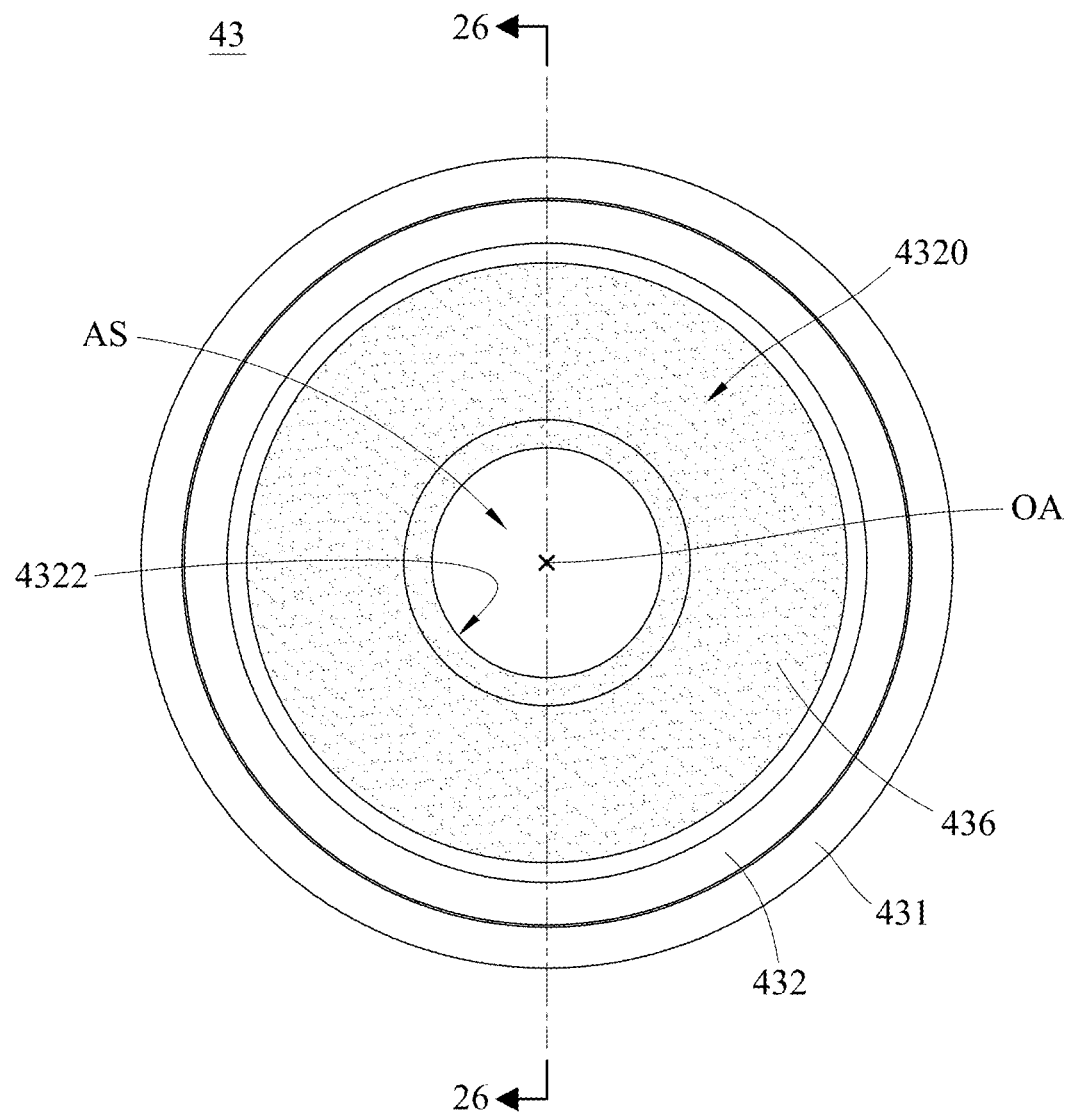
FIG. 25 is a top view of a lens barrel of the imaging lens in FIG. 22.
Figure 26:
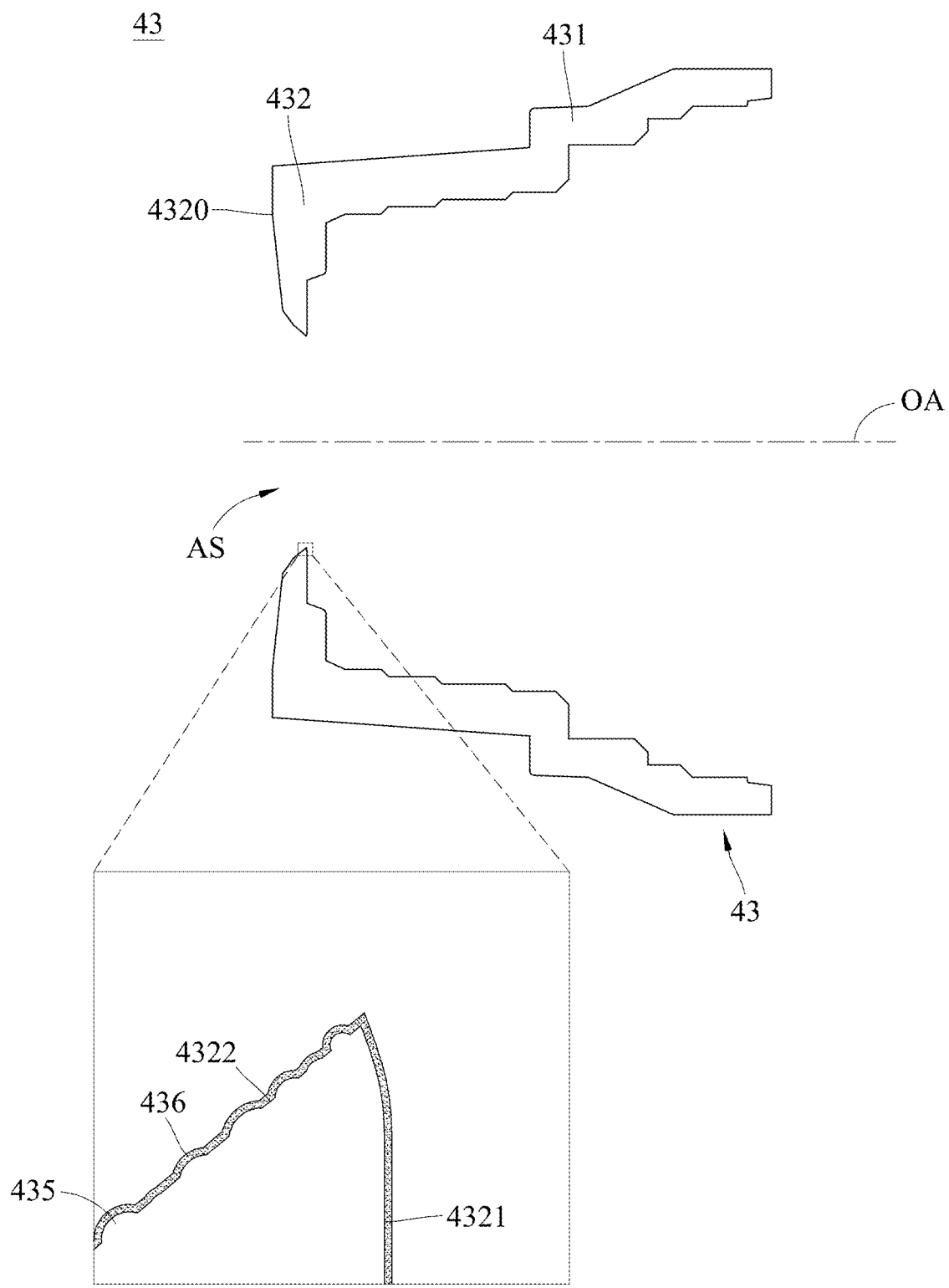
FIG. 26 is a cross-sectional view of the lens barrel along line 26-26 in FIG. 25.
Figure 27:
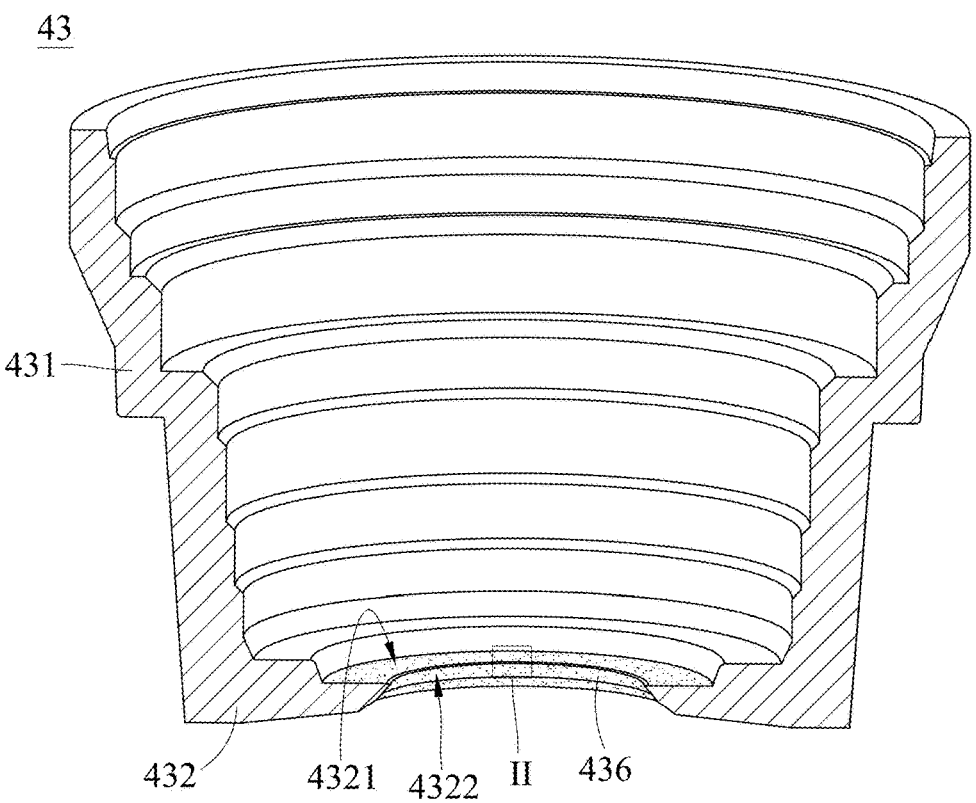
FIG. 27 is a perspective view of the lens barrel of the imaging lens in FIG. 22 that has been sectioned.
Figure 28:
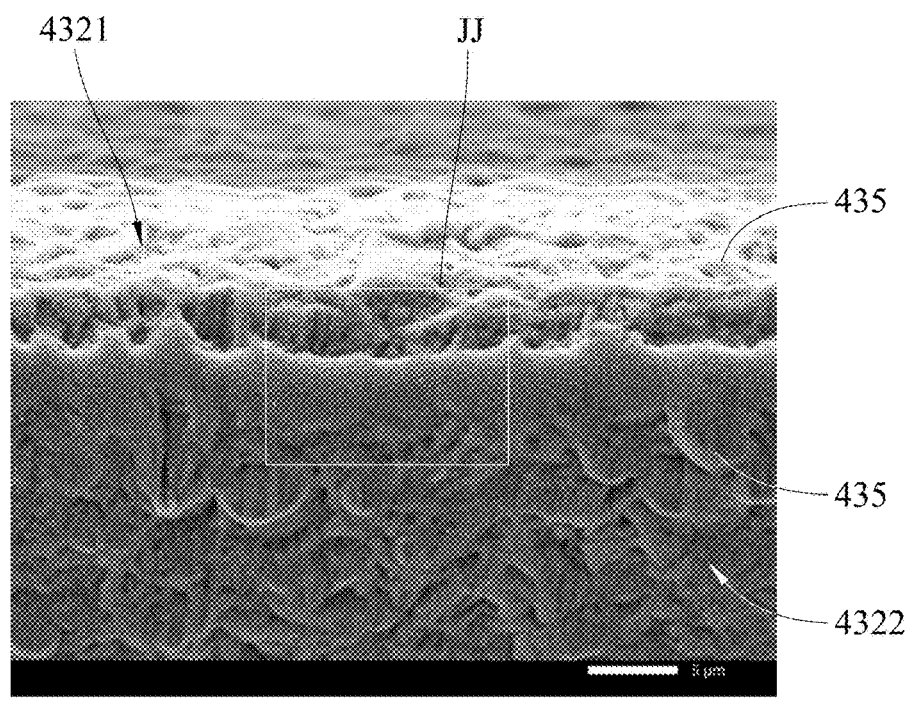
FIG. 28 is a schematic view of II region of the sectioned lens barrel in FIG. 27 at a scale of 1:3000.
Figure 29:
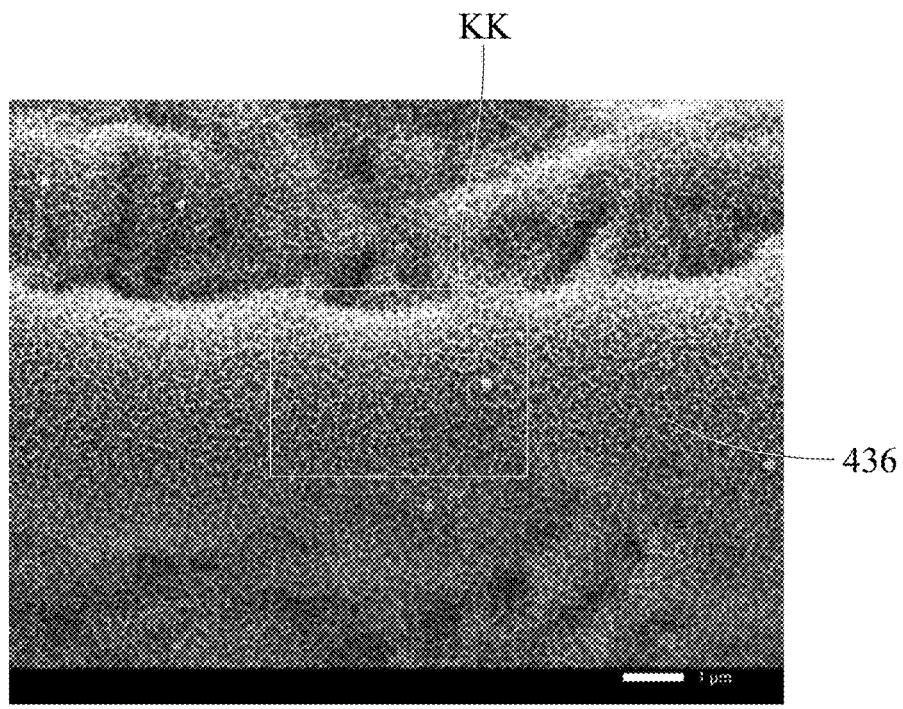
FIG. 29 is a schematic view of JJ region of II region in FIG. 28 at a scale of 1:10000.
Figure 30:
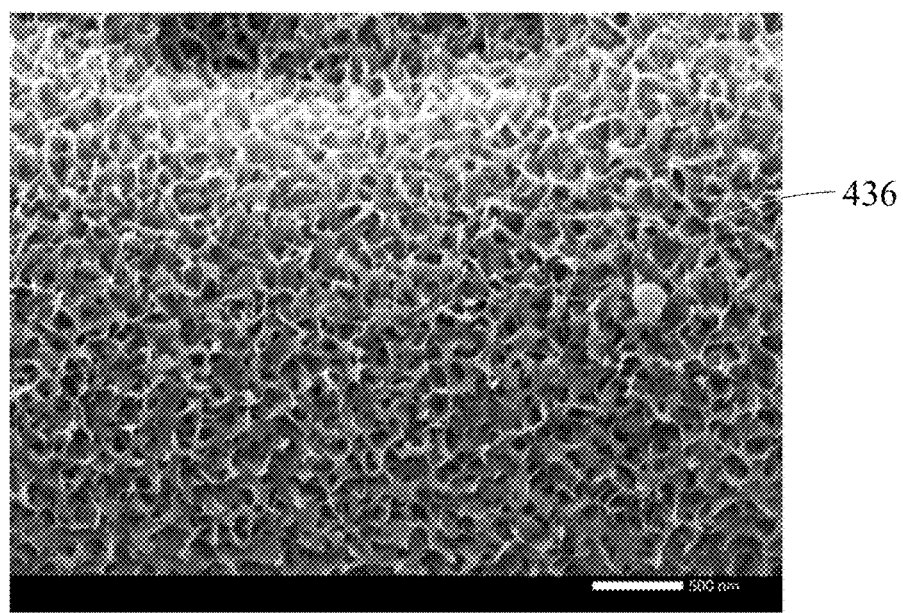
FIG. 30 is a schematic view of KK region of JJ region in FIG. 29 at a scale of 1:30000.

Please refer to FIG. 22 to FIG. 30, where FIG. 22 is a cross-sectional view of an imaging lens according to the 4th embodiment of the present disclosure, FIG. 23 is a top view of a light blocking sheet of the imaging lens in FIG. 22, FIG. 24 is a cross-sectional view of the light blocking sheet along line 24-24 in FIG. 23, FIG. 25 is a top view of a lens barrel of the imaging lens in FIG. 22, FIG. 26 is a cross-sectional view of the lens barrel along line 26-26 in FIG. 25, FIG. 27 is a perspective view of the lens barrel of the imaging lens in FIG. 22 that has been sectioned, FIG. 28 is a schematic view of II region of the sectioned lens barrel in FIG. 27 at a scale of 1:3000, FIG. 29 is a schematic view of JJ region of II region in FIG. 28 at a scale of 1:10000, and FIG. 30 is a schematic view of KK region of JJ region in FIG. 29 at a scale of 1:30000.

This embodiment provides an imaging lens 4 through which an optical axis OA passes. The imaging lens 4 includes a light blocking sheet 41, a lens group 42, a lens barrel 43, and an image surface 44. The light blocking sheet 41 and the lens group 42 are accommodated in the lens barrel 43. Light incident into the lens barrel 43 can pass through the light blocking sheet 41 and the lens group 42 to become imaging light projected onto the image surface 44. Please be noted that each element in the lens barrel 43 is not limited to the configuration shown in the drawings.

The light blocking sheet 41 is a multi-layer structure where a substrate layer L1 made of a plastic material is clamped by two cover layers L2 at two opposite sides thereof. The light blocking sheet 41 includes an object-side surface 411, an image-side surface 412, an inner ring surface 413, a plurality of tapered light blocking structures 414, a microstructure 415, and a nanostructure layer 416. The object-side surface 411 is perpendicular to and surrounds the optical axis OA. The image-side surface 412 is opposite to the object-side surface 411, and the image-side surface 412 is located closer to an image side of the imaging lens 4 than the object-side surface 411. The inner ring surface 413 is connected to and located between the object-side surface 411 and the image-side surface 412. The inner ring surface 413 is a single-side-tapered surface, and the inner ring surface 413 surrounds the optical axis OA and defines a light passage opening LPO by its tip-end close to the image side of the imaging lens 4.

As shown in FIG. 23 and FIG. 24, the inner ring surface 413 is able for the tapered light blocking structures 414 to be disposed thereon. Each of the tapered light blocking structures 414 protrudes from the inner ring surface 413 and tapers off towards the optical axis OA, and the tapered light blocking structures 414 are periodically arranged to surround the optical axis OA. The tapered light blocking structures 414 are integrally formed with the remaining part of the light blocking sheet 41.

As shown in FIG. 23, the contour of each of the tapered light blocking structures 414 has a first curved part CP1 and a second curved part CP2 in the view along the optical axis OA. The center of curvature of the first curved part CP1 is located farther away from the optical axis OA than the first curved part CP1. The center of curvature of the second curved part CP2 is located closer to the optical axis OA than the second curved part CP2. The first curved part CP1 and the second curved part CP2 are directly connected to each other. The first curved part CP1 is located closer to the optical axis OA than the second curved part CP2, and each of the first curved part CP1 and the second curved part CP2 forms a curved surface (not numbered) on the inner ring surface 413. Also, the second curved part CP2 is connected to another first curved part CP1 of another tapered light blocking structure 414 adjacent thereto. It can be considered that the first curved parts CP1 and the second curved parts CP2 are alternately arranged.

As shown in FIG. 24, the microstructure 415 is disposed on the object-side surface 411 of the light blocking sheet 41 rather than disposed on the image-side surface 412 and the inner ring surface 413. The microstructure 415 has a plurality of protrusions PR, and the average structure height of at least three or more protrusions PR among the microstructure 415 ranges from 0.25 micrometers to 19 micrometers. Each protrusion PR of the microstructure 415 is arc-shaped in the cross-sectional view of the light blocking sheet 41.

As shown in FIG. 23 and FIG. 24, the nanostructure layer 416 is disposed on the tapered light blocking structure 414 where the inner ring surface 413 is disposed (including the curved surfaces formed by the first curved part CP1 and the second curved part CP2), and the nanostructure layer 416 can be further disposed on the object-side surface 411 and can be evenly distributed on the microstructure 415. It can be considered that the nanostructure layer 416 is disposed on the tapered light blocking structures 414 on the inner ring surface 413 and on the microstructure 415 on the object-side surface 411. The nanostructure layer 416 has a plurality of ridge-like protrusions (not shown) that extend non-directionally from the curved surfaces, and the average structure height of at least three or more ridge-like protrusions among the nanostructure layer 416 ranges from 98 nanometers to 350 nanometers.

When a thickness of the light blocking sheet 41 is T, the following condition is satisfied: T=30 [um].

When the quantity of the plurality of tapered light blocking structures 414 is N, the following condition is satisfied: N=60.

When a curvature radius of the first curved part CP1 is $R_{VC}$, a curvature radius of the second curved part CP2 is $R_C$, and a radius of the light passage opening LPO is $R_L$, the following conditions are satisfied: $R_{VC}$=0.01 [mm]; $R_C$=0.04 [mm]; $R_L$=0.97 [mm]; $R_C/R_{VC}$=4; $(R_{VC}/R_L)\times1.02\pi^4$=1.02; and $(R_C/R_L)\times1.02\pi^4$=4.1.

When an average reflectivity of the object-side surface 411 where the nanostructure layer 416 is disposed for light with a wavelength ranging from 750 nanometers to 900 nanometers is $R_{7590}$, the following condition is satisfied: $R_{7590}\leq0.65\%$. When an average reflectivity of the object-side surface 411 where the nanostructure layer 416 is disposed for light with a wavelength ranging from 380 nanometers to 400 nanometers is $R_{3840}$, the following condition is satisfied: $R_{3840}\leq0.75\%$. When an average reflectivity of the object-side surface 411 where the nanostructure layer 416 is disposed for light with a wavelength ranging from 400 nanometers to 700 nanometers is $R_{4070}$, the following condition is satisfied: $R_{4070}\leq0.5\%$.

The lens barrel 43 can also be provided with a structure similar to the abovementioned nanostructure layer 416 so as to further reduce reflection of stray light in the lens barrel 43. Specifically, the lens barrel 43 includes a cylindrical portion 431 and a plate portion 432, a microstructure 435, and a nanostructure layer 436. The cylindrical portion 431 surrounds about the optical axis OA. The plate portion 432 is connected to the cylindrical portion 431, and the plate portion 432 extends towards the optical axis OA and forms an aperture stop AS. The plate portion 432 has an exposed surface 4320, an abut surface 4321 and an inner wall surface 4322. The exposed surface 4320 is exposed to outside. The abut surface 4321 is in physical contact with an optical element (not numbered) inside the lens barrel 43. The inner wall surface 4322 extends towards the abut surface 4321 from the aperture stop AS.

As shown in FIG. 26, the inner wall surface 4322 is able for the microstructure 435 to be disposed thereon, and the microstructure 435 is integrally formed with the remaining part of the lens barrel 43. As shown in FIG. 26 and FIG. 28, the microstructure 435 has a plurality of protrusions (not numbered).

As shown in FIG. 26 and FIG. 27, the nanostructure layer 436 is disposed on the exposed surface 4320 and the abut surface 4321. The nanostructure layer 436 is further disposed on the inner wall surface 4322 to cover and be in physical contact with the microstructure 435 on the inner wall surface 4322.

As shown in FIG. 26 and FIG. 28, the nanostructure layer 436 is evenly distributed on the microstructure 435 and maintains the shape of the microstructure 435.

5th Embodiment

Figure 31:
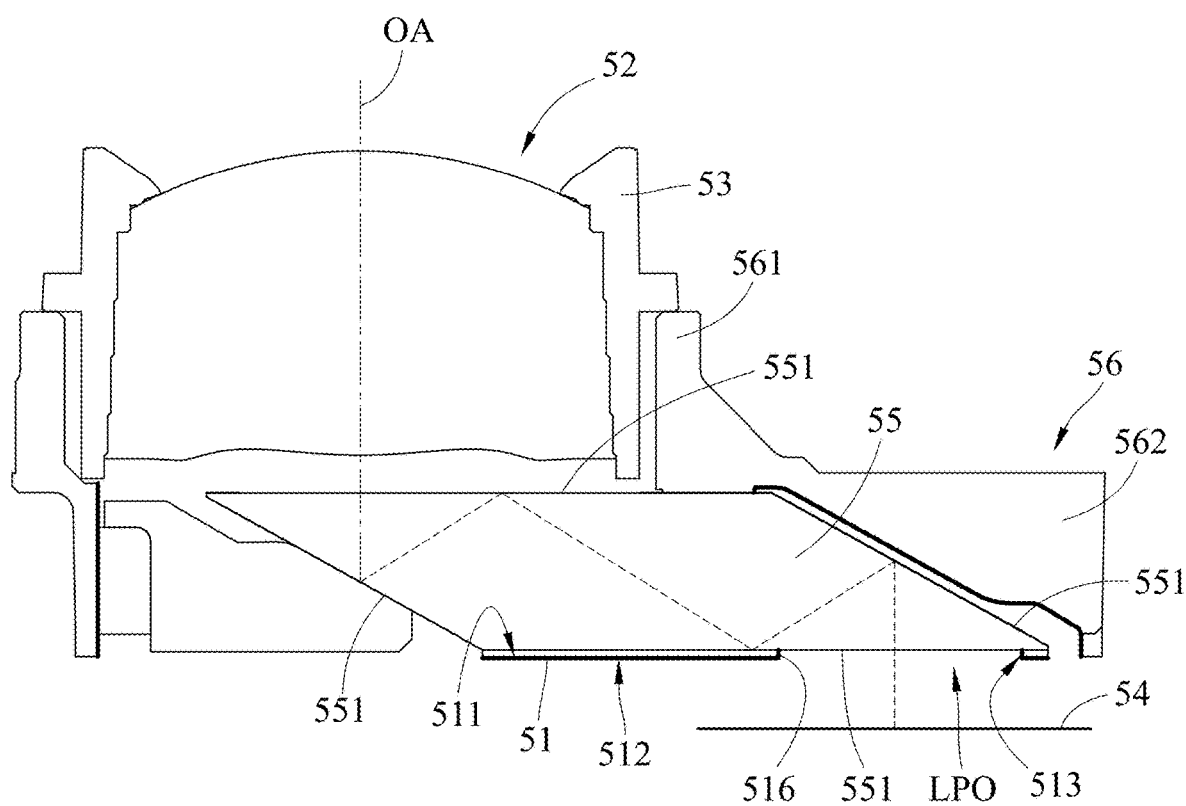
FIG. 31 is a cross-sectional view of an imaging lens according to the 5th embodiment of the present disclosure.
Figure 32:
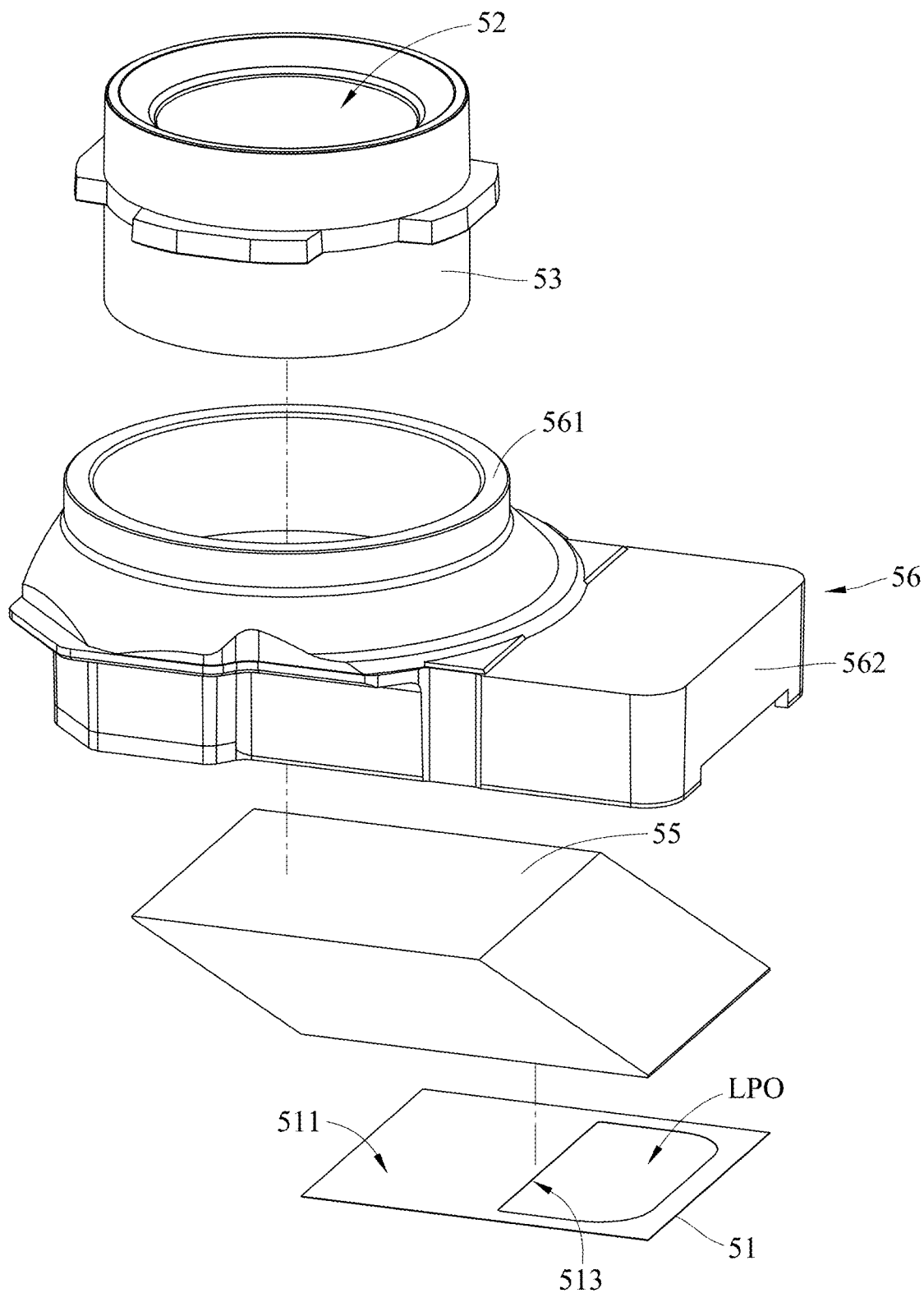
FIG. 32 is an exploded view of the imaging lens in FIG. 31.
Figure 33:
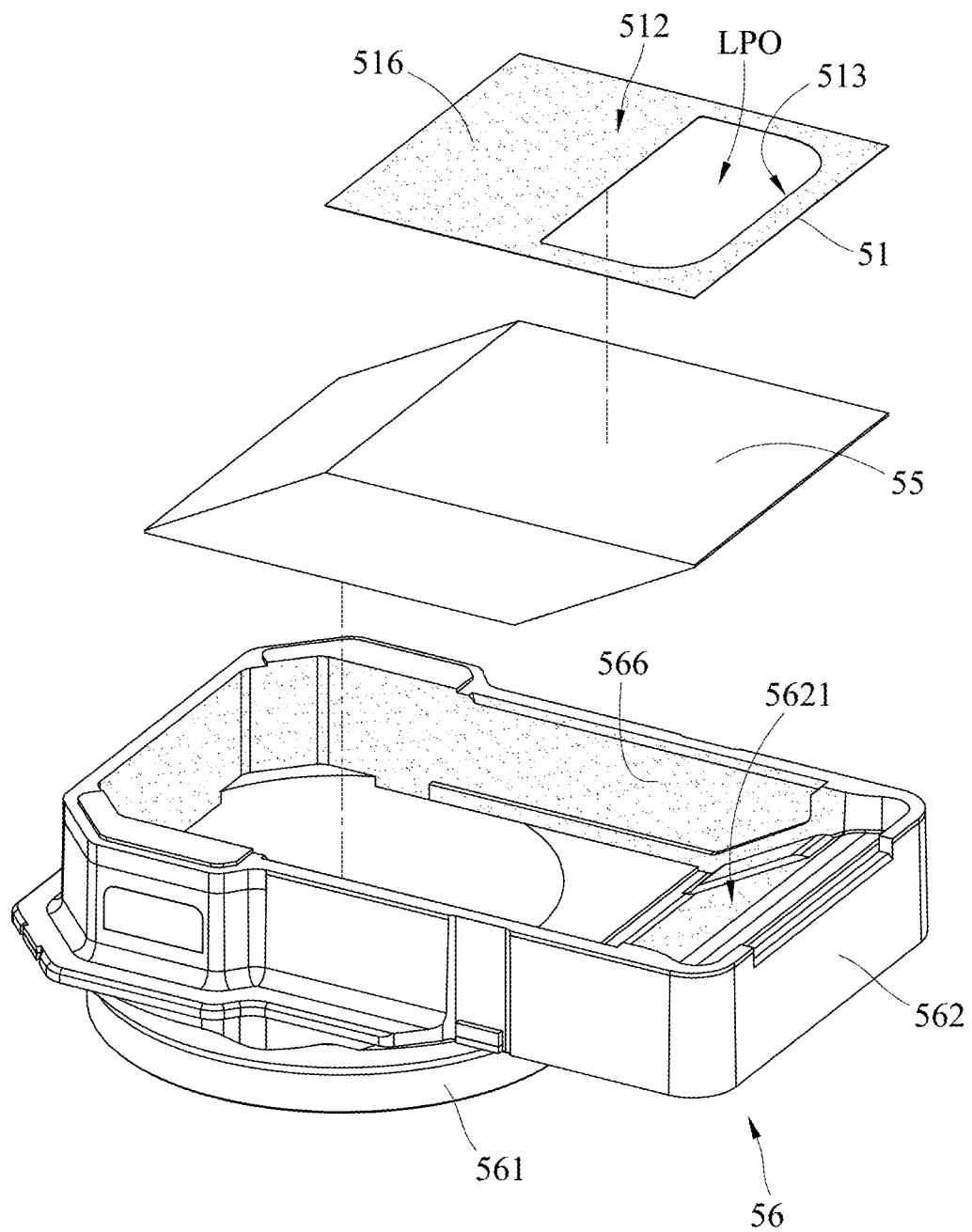
FIG. 33 is another exploded view of part of the imaging lens in FIG. 31.

Please refer to FIG. 31 to FIG. 33, where FIG. 31 is a cross-sectional view of an imaging lens according to the 5th embodiment of the present disclosure, FIG. 32 is an exploded view of the imaging lens in FIG. 31, and FIG. 33 is another exploded view of part of the imaging lens in FIG. 31.

This embodiment provides an imaging lens 5 through which an optical axis OA passes. The imaging lens 5 includes a light blocking sheet 51, a lens group 52, a lens barrel 53, an image surface 54, a reflective element 55, and a holder 56. The lens group 52 is accommodated in the lens barrel 53. The light blocking sheet 51 and the reflective element 55 are accommodated in the holder 56, and the holder 56 is fixedly mounted on the lens barrel 53. Light incident into the lens barrel 53 can pass through the lens group 52 to enter the holder 56, then the incident light can pass through the reflective element 55 and the light blocking sheet 51 with its direction changed by the reflective element 55, and then the incident light emits from the holder 56 to become imaging light projected onto the image surface 54. In detail, the reflective element 55 is disposed at an image side of the lens barrel 53, and the reflective element 55 has four reflective surfaces 551. Moreover, the reflective element 55 can include a plurality of prisms to be combined for forming the abovementioned four reflective surfaces 551, but the present disclosure is not limited thereto. As shown in FIG. 31, the reflective surfaces 551 change the travelling direction of light from the lens barrel 53 (i.e., changing the direction of the optical axis OA). Please be noted that each element in the lens barrel 53 or the holder 56 is not limited to the configuration shown in the drawings.

The light blocking sheet 51 includes an object-side surface 511, an image-side surface 512, an inner ring surface 513, and a nanostructure layer 516. The object-side surface 511 is perpendicular to and surrounds the optical axis OA. The image-side surface 512 is opposite to the object-side surface 511, and the image-side surface 512 is located closer to an image side of the imaging lens 5 than the object-side surface 511. The inner ring surface 513 is connected to and located between the object-side surface 511 and the image-side surface 512, and the inner ring surface 513 surrounds the optical axis OA and defines a light passage opening LPO.

The light blocking sheet 51 is attached on one of the reflective surfaces 551 for reducing stray light generated from the reflective element 55. Specifically, the nanostructure layer 516 of the light blocking sheet 51 is disposed on the image-side surface 512 and the inner ring surface 513 so as to reduce reflection of stray light inside the holder 56.

When an average reflectivity of the image-side surface 512 where the nanostructure layer 516 is disposed for light with a wavelength ranging from 750 nanometers to 900 nanometers is $R_{7590}$, the following condition is satisfied: $R_{7590} \leq 0.65\%$. When an average reflectivity of the image-side surface 512 where the nanostructure layer 516 is disposed for light with a wavelength ranging from 380 nanometers to 400 nanometers is $R_{3840}$, the following condition is satisfied: $R_{3840} \leq 0.75\%$. When an average reflectivity of the image-side surface 512 where the nanostructure layer 516 is disposed for light with a wavelength ranging from 400 nanometers to 700 nanometers is $R_{4070}$, the following condition is satisfied: $R_{4070} \leq 0.5\%$.

The holder 56 includes a holding part 561, a base 562, and a nanostructure layer 566. The holding part 561 holds the lens barrel 53. The base 562 extends from the holding part 561. The base 562 is located closer to the image surface 54 than the holding part 561, such that the lens group 52 is spaced apart from the image surface 54.

The base 562 has an inner ring surface 5621 at an inner side thereof. The inner ring surface 5621 faces the reflective element 55. The nanostructure layer 566 is disposed on the inner ring surface 5621 of the base 562 so as to reduce reflection of stray light inside the holder 56.

6th Embodiment

Figure 35:
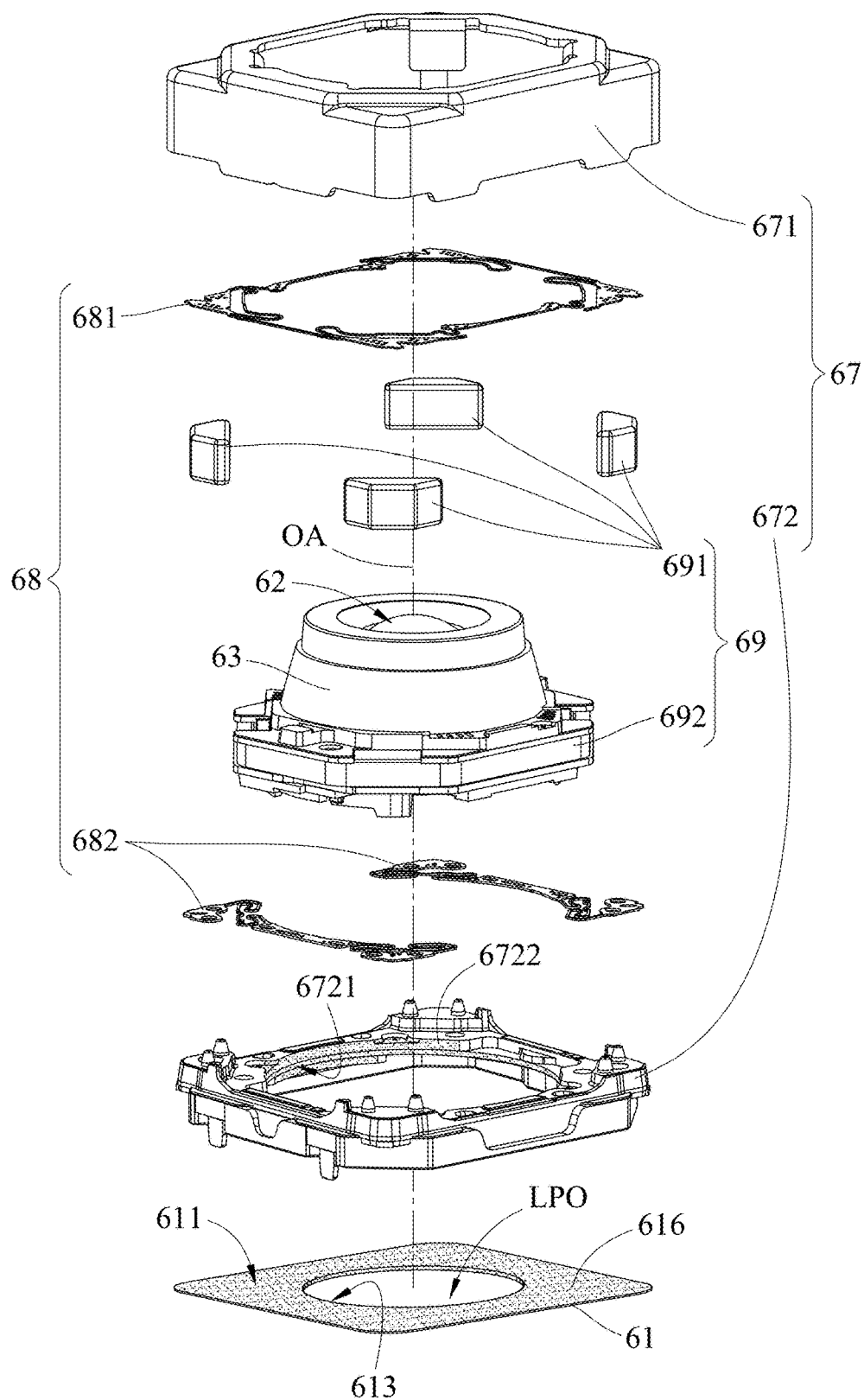
FIG. 35 is an exploded view of the imaging lens in FIG. 34.
Figure 36:
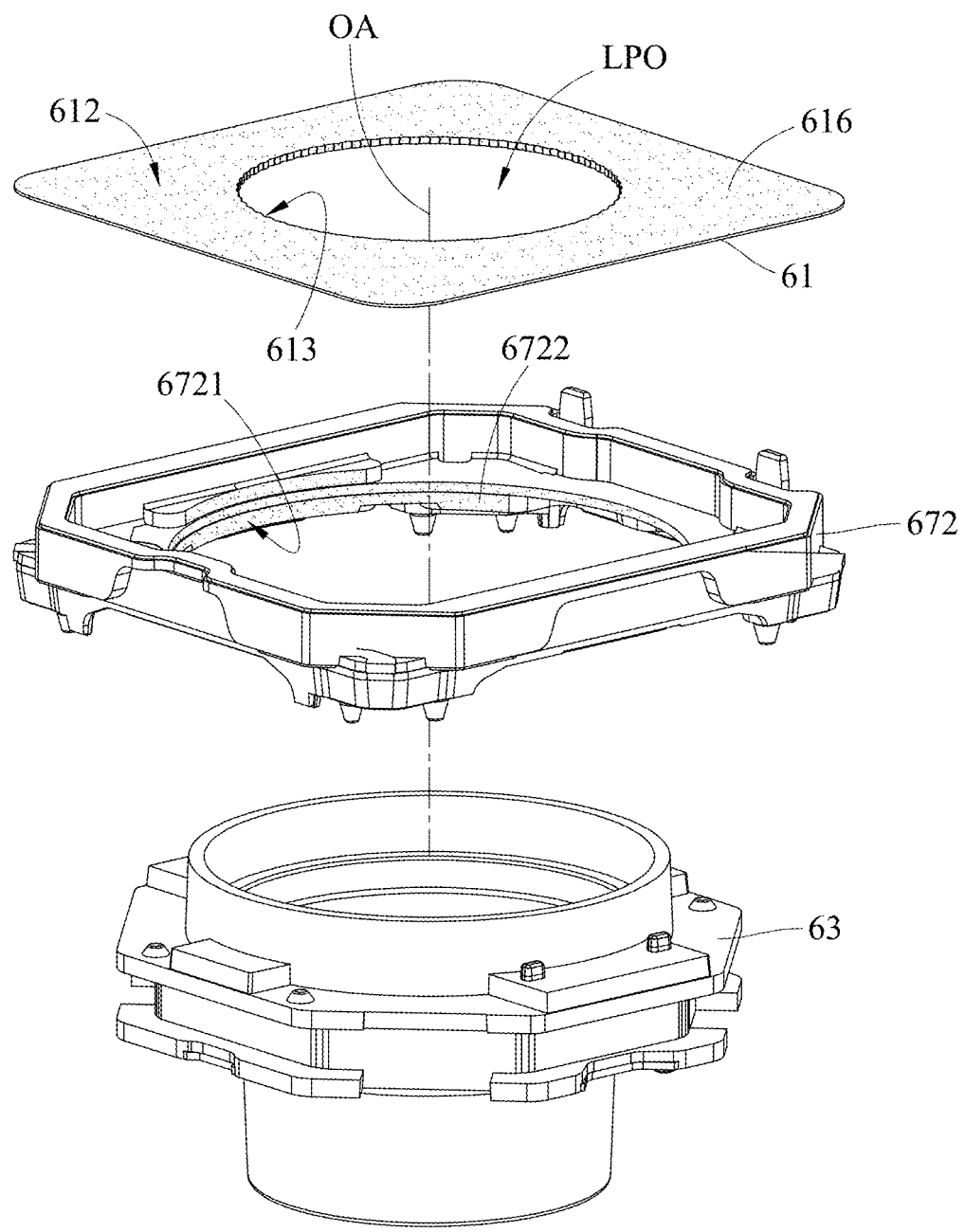
FIG. 36 is another exploded view of part of the imaging lens in FIG. 34.

Please refer to FIG. 34 to FIG. 36, where FIG. 34 is a cross-sectional view of an imaging lens according to the 6th embodiment of the present disclosure, FIG. 35 is an exploded view of the imaging lens in FIG. 34, and FIG. 36 is another exploded view of part of the imaging lens in FIG. 34.

This embodiment provides an imaging lens 6 through which an optical axis OA passes. The imaging lens 6 includes a light blocking sheet 61, a lens group 62, a lens barrel 63, an image surface 64, a fixed part 67, an elastic element group 68, and a driving part 69. The fixed part 67 includes a casing 671 and a drive maintaining part 672, and the casing 671 and the drive maintaining part 672 together form an accommodation space therebetween (not numbered). The elastic element group 68 includes an upper elastic element 681 and two lower elastic elements 682. The driving part 69 includes a plurality of magnetic elements 691 and a coil 692. The lens group 62 is accommodated in the lens barrel 63. The lens barrel 63 has an object side movably disposed inside the casing 671 via the upper elastic element 681 and an image side movably disposed on the drive maintaining part 672 via the lower elastic elements 682, and the lens barrel 63 is supported by the drive maintaining part 672. The magnetic elements 691 are disposed inside the casing 671. The coil 692 is disposed outside the lens barrel 63. The interaction between the magnetic elements 691 and the coil 692 can move the lens barrel 63 with respect to the casing 671, the drive maintaining part 672, and the image surface 64. The light blocking sheet 61 is disposed at an image side of the drive maintaining part 672. Light incident into the lens barrel 63 can pass through the lens group 62 and the light blocking sheet 61 to become imaging light projected onto the image surface 64 with the cooperation of focus position adjustment provided by the driving part 69. Please be noted that each element in the lens barrel 63 or the fixed part 67 is not limited to the configuration shown in the drawings.

The light blocking sheet 61 includes an object-side surface 611, an image-side surface 612, an inner ring surface 613, and a nanostructure layer 616. The object-side surface 611 is perpendicular to and surrounds the optical axis OA. The image-side surface 612 is opposite to the object-side surface 611, and the image-side surface 612 is located closer to an image side of the imaging lens 6 than the object-side surface 611. The inner ring surface 613 is connected to and located between the object-side surface 611 and the image-side surface 612, and the inner ring surface 613 surrounds the optical axis OA and defines a light passage opening LPO.

The light blocking sheet 61 is attached on the drive maintaining part 672 for reducing stray light between the lens barrel 63 and the image surface 64. Specifically, the nanostructure layer 616 of the light blocking sheet 61 is disposed on the object-side surface 611, image-side surface 612 and the inner ring surface 613 so as to reduce reflection of stray light between the lens barrel 63 and the image surface 64.

When an average reflectivity of the object-side surface 611 and the image-side surface 612 where the nanostructure layer 616 is disposed for light with a wavelength ranging from 750 nanometers to 900 nanometers is $R_{7590}$, the following condition is satisfied: $R_{7590} \leq 0.65\%$. When an average reflectivity of the object-side surface 611 and the image-side surface 612 where the nanostructure layer 616 is disposed for light with a wavelength ranging from 380 nanometers to 400 nanometers is $R_{3840}$, the following condition is satisfied: $R_{3840} \leq 0.75\%$. When an average reflectivity of the object-side surface 611 and the image-side surface 612 where the nanostructure layer 616 is disposed for light with a wavelength ranging from 400 nanometers to 700 nanometers is $R_{4070}$, the following condition is satisfied: $R_{4070} \leq 0.5\%$.

The drive maintaining part 672 has an inner ring surface 6721 at an inner side thereof and includes a nanostructure layer 6722. The inner ring surface 6721 faces the optical axis OA. The nanostructure layer 6722 is disposed on the inner ring surface 6721 so as to reduce reflection of stray light inside the drive maintaining part 672.

7th Embodiment

Figure 37:
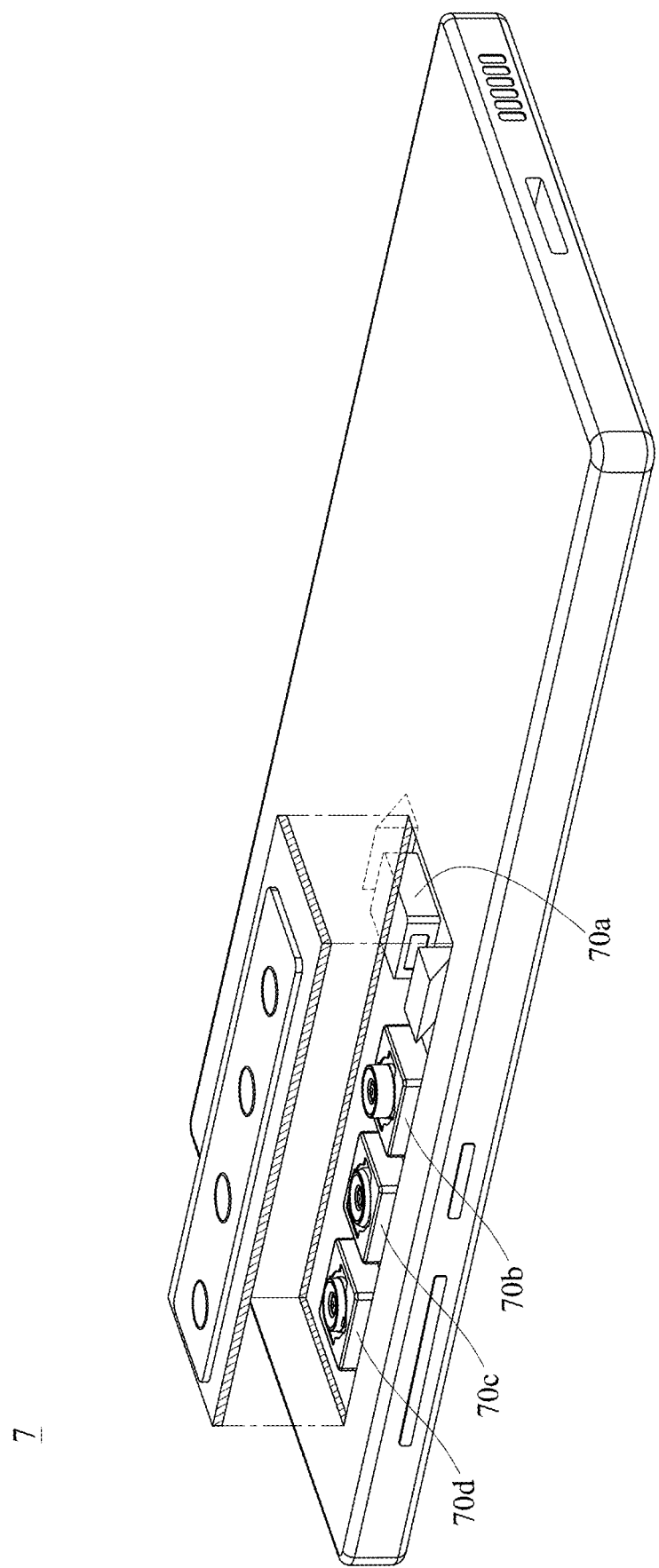
FIG. 37 is an exploded view of an electronic device according to the 7th embodiment of the present disclosure.

Please refer to FIG. 37, which is an exploded view of an electronic device according to the 7th embodiment of the present disclosure.

An electronic device 7 provided in this embodiment is a smartphone including an imaging lens 70a, an imaging lens 70b, an imaging lens 70c, an imaging lens 70d, a flash module, a focus assist module, an image signal processor, a display module and an image software processor (not shown). The imaging lens 70a, the imaging lens 70b, the imaging lens 70c, and the imaging lens 70d are disposed on the same side of the electronic device 7, while the display module is disposed on the opposite side of the electronic device 7. Moreover, the imaging lens 70a is the imaging lens 5 disclosed in the 5th embodiment, and the imaging lens 70b is the imaging lens 1 disclosed in the 1st embodiment. However, the present disclosure is not limited thereto. The imaging lens 70a or the imaging lens 70b may be the imaging lens disclosed in any one of the abovementioned embodiments.

The imaging lens 70a is an ultra-telephoto lens, the imaging lens 70b is a telephoto lens, the imaging lens 70c is a wide-angle main lens, and the imaging lens 70d is an ultra-wide-angle lens. The imaging lens 70a may have a field of view ranging from 5 degrees to 30 degrees, the imaging lens 70b may have a field of view ranging from 30 degrees to 60 degrees, the imaging lens 70c may have a field of view ranging from 65 degrees to 90 degrees, and the imaging lens 70d may have a field of view ranging from 93 degrees to 175 degrees. In this embodiment, the imaging lenses 70a, 70b, 70c and 70d have different fields of view, such that the electronic device 7 can have various magnification ratios so as to meet the requirement of optical zoom functionality. Moreover, the imaging lens 70a is an ultra-telephoto lens having the reflective element 55, which is favorable for thinness of the electronic device 7. In this embodiment, the electronic device 7 includes multiple imaging lenses 70a, 70b, 70c and 70d, but the present disclosure is not limited to the number and arrangement of imaging lenses.

When a user captures images of an object, the light rays converge in the imaging lens 70a, the imaging lens 70b, the imaging lens 70c or the imaging lens 70d to generate images, and the flash module is activated for light supplement. The focus assist module detects the object distance of the imaged object to achieve fast auto focusing. The image signal processor is configured to optimize the captured image to improve image quality and provided zooming function. The light beam emitted from the focus assist module can be either conventional infrared or laser. The display module can include a touch screen or a physical button. The image software processor having multiple functions to capture images and complete image processing, and the image processed by the image software processor can be displayed on the display module.

Please be noted that a lens cover of the electronic device 7 shown in FIG. 37 being spaced apart from the main body thereof is only for better showing the imaging lenses inside the electronic device 7. It doesn't mean the lens cover have to be removable, and the present disclosure is not limited thereto.

The smartphone in these embodiments is only exemplary for showing the imaging lenses 1-6 of the present disclosure installed in the electronic device 7, and the present disclosure is not limited thereto. The imaging lenses 1-5 can be optionally applied to optical systems with a movable focus. Furthermore, the imaging lenses 1-5 features good capability in aberration corrections and high image quality, and can be applied to 3D image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens through which an optical axis passes, and the imaging lens comprising:
   a light blocking sheet, comprising:
      an object-side surface, perpendicular to and surrounding the optical axis;
      an image-side surface, opposite to the object-side surface, wherein the image-side surface is located closer to an image side of the imaging lens than the object-side surface;
      an inner ring surface, connected to and located between the object-side surface and the image-side surface, wherein the inner ring surface surrounds the optical axis and defines a light passage opening;
      a plurality of tapered light blocking structures, disposed on the inner ring surface, wherein each of the plurality of tapered light blocking structures protrudes from the inner ring surface and tapers off towards the optical axis, the plurality of tapered light blocking structures are periodically arranged to surround the optical axis, a contour of each of the plurality of tapered light blocking structures has a first curved part and a second curved part in a view along the optical axis, the first curved part is located closer to the optical axis than the second curved part, and each of the first curved part and the second curved part forms a curved surface on the inner ring surface; and
      a nanostructure layer, at least disposed on the curved surfaces formed by the first curved part and the second curved part, wherein the nanostructure layer has a plurality of ridge-like protrusions that extend non-directionally from the curved surfaces.

2. The imaging lens according to claim 1, wherein the light blocking sheet comprises a plastic material.

3. The imaging lens according to claim 2, wherein the plurality of ridge-like protrusions are wide at a bottom side and narrow at a top side thereof, and an average structure height of the nanostructure layer ranges from 98 nanometers to 350 nanometers.

4. The imaging lens according to claim 2, wherein a center of curvature of the first curved part is located farther away from the optical axis than the first curved part, a curvature radius of the first curved part is RVC, and the following condition is satisfied:
   0.005 [mm]≤RVC≤0.37 [mm].

5. The imaging lens according to claim 2, wherein a center of curvature of the second curved part is located closer to the optical axis than the second curved part, a curvature radius of the second curved part is RC, and the following condition is satisfied:
   0.008 [mm]≤RC≤0.42 [mm].

6. The imaging lens according to claim 2, wherein a center of curvature of the first curved part is located farther away from the optical axis than the first curved part, a center of curvature of the second curved part is located closer to the optical axis than the second curved part, a curvature radius of the first curved part is RVC, a curvature radius of the second curved part is RC, and the following condition is satisfied:

0.3≤ RC/RVC≤35.

7. The imaging lens according to claim 2, wherein the nanostructure layer is further disposed on at least one of the object-side surface and the image-side surface.

8. The imaging lens according to claim 7, wherein the nanostructure layer is further disposed on one of the object-side surface and the image-side surface.

9. The imaging lens according to claim 2, wherein the light blocking sheet further comprises a microstructure disposed on at least one of the object-side surface and the image-side surface, the microstructure has a plurality of protrusions, and an average structure height of the microstructure ranging from 0.25 micrometers to 19 micrometers.

10. The imaging lens according to claim 2, wherein the plurality of tapered light blocking structures are integrally formed with a remaining part of the light blocking sheet.

11. The imaging lens according to claim 2, wherein a quantity of the plurality of tapered light blocking structures is N, and the following condition is satisfied:

39≤N≤147.

12. The imaging lens according to claim 7, wherein an average reflectivity of the at least one of the object-side surface and the image-side surface where the nanostructure layer is disposed for light with a wavelength ranging from 750 nanometers to 900 nanometers is R7590, and the following condition is satisfied:

R7590≤0.65%.

13. The imaging lens according to claim 7, wherein an average reflectivity of the at least one of the object-side surface and the image-side surface where the nanostructure layer is disposed for light with a wavelength ranging from 380 nanometers to 400 nanometers is R3840, and the following condition is satisfied:

R3840≤0.75%.

14. The imaging lens according to claim 7, wherein an average reflectivity of the at least one of the object-side surface and the image-side surface where the nanostructure layer is disposed for light with a wavelength ranging from 400 nanometers to 700 nanometers is R4070, and the following condition is satisfied:

R4070≤0.5%.

15. The imaging lens according to claim 2, wherein a thickness of the light blocking sheet is T, and the following condition is satisfied:

2 [um]≤T≤88 [um].

16. The imaging lens according to claim 2, wherein the imaging lens further comprising:
a lens barrel, accommodating the light blocking sheet, and the lens barrel comprising:
a cylindrical portion, surrounding about the optical axis; and
a plate portion, connected to the cylindrical portion, wherein the plate portion extends towards the optical axis and forms an aperture stop, and the plate portion has:
an abut surface, in physical contact with the light blocking sheet; and
an inner wall surface, extending towards the abut surface from the aperture stop, wherein the inner wall surface is spaced apart from the light blocking sheet by a distance along a direction in parallel with the optical axis, and the distance gradually decreases along a direction away from the optical axis.

17. The imaging lens according to claim 16, wherein the imaging lens sequentially along the optical axis comprising:
the light blocking sheet;
a first lens element, accommodated in the lens barrel; and
a second lens element, accommodated in the lens barrel;
wherein a maximum value of the distance is Dmax, a central thickness of the second lens element is CT2, and the following condition is satisfied:
0.26≤Dmax/CT2≤3.2.

18. The imaging lens according to claim 17, wherein the central thickness of the second lens element is CT2, and the following condition is satisfied:

0.08 [mm]≤CT2≤0.82 [mm].

19. The imaging lens according to claim 2, further comprising a lens group, wherein the lens group comprises a plurality of lens elements, and the nanostructure layer is disposed on at least one of the plurality of lens elements.

20. An imaging lens through which an optical axis passes, and the imaging lens comprising:
a light blocking sheet, comprising:
an object-side surface, perpendicular to and surrounding the optical axis;
an image-side surface, opposite to the object-side surface, wherein the image-side surface is located closer to an image side of the imaging lens than the object-side surface;
an inner ring surface, connected to and located between the object-side surface and the image-side surface, wherein the inner ring surface surrounds the optical axis and defines a light passage opening;
a plurality of tapered light blocking structures, disposed on the inner ring surface, wherein each of the plurality of tapered light blocking structures protrudes from the inner ring surface and tapers off towards the optical axis, the plurality of tapered light blocking structures are periodically arranged to surround the optical axis, a contour of each of the plurality of tapered light blocking structures has at least one curved part in a view along the optical axis, and the at least one curved part forms a curved surface on the inner ring surface; and
a nanostructure layer, at least disposed on the curved surfaces formed by the at least one curved part, wherein the nanostructure layer has a plurality of ridge-like protrusions that extend non-directionally from the curved surfaces;
when a curvature radius of the at least one curved part which has a center of curvature located farther away from the optical axis than the at least one curved part is RVC, and a radius of the light passage opening is RL, the following condition is satisfied:
0.05≤(RVC/RL)×1.02π4≤34;
when a curvature radius of the at least one curved part which has a center of curvature located closer to the optical axis than the at least one curved part is RC, and the radius of the light passage opening is RL, the following condition is satisfied:
0.11≤(RC/RL)×1.02π4≤49.

21. The imaging lens according to claim 20, wherein the light blocking sheet comprises a plastic material.

22. The imaging lens according to claim 21, wherein the plurality of ridge-like protrusions are wide at a bottom side and narrow at a top side thereof, and an average structure height of the nanostructure layer ranges from 98 nanometers to 350 nanometers.

23. The imaging lens according to claim 22, wherein the nanostructure layer is further disposed on at least one of the object-side surface and the image-side surface.

24. The imaging lens according to claim 23, wherein the nanostructure layer is further disposed on one of the object-side surface and the image-side surface.

25. The imaging lens according to claim 22, wherein the light blocking sheet further comprises a microstructure disposed on at least one of the object-side surface and the image-side surface, the microstructure has a plurality of protrusions, and an average structure height of the microstructure ranging from 0.25 micrometers to 19 micrometers.

26. The imaging lens according to claim 21, wherein the plurality of tapered light blocking structures are integrally formed with a remaining part of the light blocking sheet.

27. The imaging lens according to claim 26, wherein a quantity of the plurality of tapered light blocking structures is N, and the following condition is satisfied:
39≤N≤147.

28. The imaging lens according to claim 23, wherein an average reflectivity of the at least one of the object-side surface and the image-side surface where the nanostructure layer is disposed for light with a wavelength ranging from 750 nanometers to 900 nanometers is R7590, and the following condition is satisfied:
R7590≤0.65%.

29. The imaging lens according to claim 23, wherein an average reflectivity of the at least one of the object-side surface and the image-side surface where the nanostructure layer is disposed for light with a wavelength ranging from 380 nanometers to 400 nanometers is R3840, and the following condition is satisfied:
R3840≤0.75%.

30. The imaging lens according to claim 23, wherein an average reflectivity of the at least one of the object-side surface and the image-side surface where the nanostructure layer is disposed for light with a wavelength ranging from 400 nanometers to 700 nanometers is R4070, and the following condition is satisfied:
R4070≤0.5%.

31. The imaging lens according to claim 22, wherein a thickness of the light blocking sheet is T, and the following condition is satisfied:
2 [um]≤T≤88 [um].

32. The imaging lens according to claim 22, wherein the imaging lens further comprising:
a lens barrel, accommodating the light blocking sheet, and the lens barrel comprising:
a cylindrical portion, surrounding about the optical axis; and
a plate portion, connected to the cylindrical portion, wherein the plate portion extends towards the optical axis and forms an aperture stop, and the plate portion has:
an abut surface, in physical contact with the light blocking sheet; and
an inner wall surface, extending towards the abut surface from the aperture stop, wherein the inner wall surface is spaced apart from the light blocking sheet by a distance along a direction in parallel with the optical axis, and the distance gradually decreases along a direction away from the optical axis.

33. The imaging lens according to claim 32, wherein the imaging lens sequentially along the optical axis comprising:
the light blocking sheet;
a first lens element, accommodated in the lens barrel; and
a second lens element, accommodated in the lens barrel;
wherein a maximum value of the distance is Dmax, a central thickness of the second lens element is CT2, and the following condition is satisfied:
0.26≤Dmax/CT2≤3.2.

34. The imaging lens according to claim 33, wherein the central thickness of the second lens element is CT2, and the following condition is satisfied:
0.08 [mm]≤CT2≤0.82 [mm].

35. The imaging lens according to claim 22, further comprising a lens group, wherein the lens group comprises a plurality of lens elements, and the nanostructure layer is disposed on at least one of the plurality of lens elements.

36. An imaging lens through which an optical axis passes, and the imaging lens comprising:
a light blocking element, comprising:
an object-side surface, perpendicular to and surrounding the optical axis;
an image-side surface, opposite to the object-side surface, wherein the image-side surface is located closer to an image side of the imaging lens than the object-side surface;
an inner ring surface, connected to and located between the object-side surface and the image-side surface, wherein the inner ring surface surrounds the optical axis and defines a light passage opening; and
a nanostructure layer, at least disposed on the inner ring surface, wherein the nanostructure layer has a plurality of ridge-like protrusions that extend non-directionally from the inner ring surface.

37. The imaging lens according to claim 36, wherein the light blocking element is a light blocking sheet.

38. The imaging lens according to claim 36, wherein the light blocking element is a spacer or a retainer.

39. The imaging lens according to claim 37, wherein the light blocking sheet comprises a plastic material.

40. The imaging lens according to claim 39, the light blocking sheet being a multi-layer structure, and the multi-layer structure comprising:
a substrate layer, made of a plastic material; and
two cover layers, wherein the substrate layer is clamped by the cover layers at two opposite sides thereof.

41. The imaging lens according to claim 39, wherein the ridge-like protrusions are wide at a bottom side and narrow at a top side thereof, and an average structure height of the nanostructure layer ranges from 98 nanometers to 350 nanometers.

42. The imaging lens according to claim 41, wherein the nanostructure layer has a material including aluminium oxide ($Al_2O_3$).

43. The imaging lens according to claim 39, wherein the light blocking element further comprises a plurality of tapered light blocking structures disposed on the inner ring surface, each of the plurality of tapered light blocking structures protrudes from the inner ring surface and tapers off towards the optical axis, the plurality of tapered light blocking structures are periodically arranged to surround the optical axis, a contour of each of the plurality of tapered light blocking structures has a first curved part and a second curved part in a view along the optical axis, each of the first curved part and the second curved part forms a curved surface on the inner ring surface, and the nanostructure layer is disposed on the curved surfaces formed by the first curved part and the second curved part.

44. The imaging lens according to claim 43, wherein a center of curvature of the first curved part is located farther away from the optical axis than the first curved part, a curvature radius of the first curved part is RVC, and the following condition is satisfied:
0.005 [mm]≤RVC≤0.37 [mm].

45. The imaging lens according to claim 43, wherein a center of curvature of the second curved part is located closer to the optical axis than the second curved part, a curvature radius of the second curved part is RC, and the following condition is satisfied:

0.008 [mm]≤RC≤0.42 [mm].

46. The imaging lens according to claim 43, wherein a center of curvature of the first curved part is located farther away from the optical axis than the first curved part, a center of curvature of the second curved part is located closer to the optical axis than the second curved part, a curvature radius of the first curved part is RVC, a curvature radius of the second curved part is RC, and the following condition is satisfied:

0.3≤RC/RVC≤35.

47. The imaging lens according to claim 39, wherein the light blocking element further comprises a microstructure disposed on at least one of the object-side surface and the image-side surface, the microstructure has a plurality of protrusions, and an average structure height of the microstructure ranging from 0.25 micrometers to 19 micrometers.

48. The imaging lens according to claim 46, wherein a quantity of the plurality of tapered light blocking structures is N, and the following condition is satisfied:

39≤N≤147.

49. The imaging lens according to claim 39, wherein the nanostructure layer is further disposed on at least one of the object-side surface and the image-side surface, an average reflectivity of the object-side surface or the image-side surface where the nanostructure layer is disposed for light with a wavelength ranging from 750 nanometers to 900 nanometers is R7590, and the following condition is satisfied:

R7590≤0.65%.

50. The imaging lens according to claim 39, wherein the nanostructure layer is further disposed on at least one of the object-side surface and the image-side surface, an average reflectivity of the object-side surface or the image-side surface where the nanostructure layer is disposed for light with a wavelength ranging from 380 nanometers to 400 nanometers is R3840, and the following condition is satisfied:

R3840≤0.75%.

51. The imaging lens according to claim 39, wherein the nanostructure layer is further disposed on at least one of the object-side surface and the image-side surface, an average reflectivity of the object-side surface or the image-side surface where the nanostructure layer is disposed for light with a wavelength ranging from 400 nanometers to 700 nanometers is R4070, and the following condition is satisfied:

R4070≤0.5%.

52. The imaging lens according to claim 39, wherein a thickness of the light blocking sheet is T, and the following condition is satisfied:

2 [um]≤T≤88 [um].

53. The imaging lens according to claim 43, wherein the imaging lens further comprising:
a lens barrel, accommodating the light blocking element, and the lens barrel comprising:
a cylindrical portion, surrounding about the optical axis; and
a plate portion, connected to the cylindrical portion, wherein the plate portion extends towards the optical axis and forms an aperture stop, and the plate portion has:
an abut surface, in physical contact with the light blocking element; and
an inner wall surface, extending towards the abut surface from the aperture stop, wherein the inner wall surface is spaced apart from the light blocking element by a distance along a direction in parallel with the optical axis, and the distance gradually decreases along a direction away from the optical axis.

54. The imaging lens according to claim 53, wherein the imaging lens sequentially along the optical axis comprising:
the light blocking element;
a first lens element, accommodated in the lens barrel; and
a second lens element, accommodated in the lens barrel;
wherein a maximum value of the distance is Dmax, a central thickness of the second lens element is CT2, and the following condition is satisfied:

0.26≤Dmax/CT2≤3.2.

55. The imaging lens according to claim 54, wherein the central thickness of the second lens element is CT2, and the following condition is satisfied:

0.08 [mm]≤CT2≤0.82 [mm].

56. The imaging lens according to claim 43, further comprising a lens group, wherein the lens group comprises a plurality of lens elements, and the nanostructure layer is disposed on at least one of the plurality of lens elements.

57. An electronic device, comprising the imaging lens of claim 1.

58. An electronic device, comprising the imaging lens of claim 16.

59. An electronic device, comprising the imaging lens of claim 20.

60. An electronic device, comprising the imaging lens of claim 32.

61. An electronic device, comprising the imaging lens of claim 36.

* * * * *